(12) United States Patent
Ishii

(10) Patent No.: US 7,703,568 B2
(45) Date of Patent: Apr. 27, 2010

(54) COAXIAL MOTORCYCLE

(75) Inventor: Shinji Ishii, Kanagawa (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 369 days.

(21) Appl. No.: 10/558,418

(22) PCT Filed: Jun. 3, 2004

(86) PCT No.: PCT/JP2004/008069
§ 371 (c)(1),
(2), (4) Date: Nov. 29, 2005

(87) PCT Pub. No.: WO2004/110854
PCT Pub. Date: Dec. 23, 2004

(65) Prior Publication Data
US 2006/0231313 A1    Oct. 19, 2006

(30) Foreign Application Priority Data
Jun. 12, 2003 (JP) .............................. 2003-168224
Jun. 12, 2003 (JP) .............................. 2003-168226

(51) Int. Cl.
*B62D 61/00* (2006.01)
*B62D 33/02* (2006.01)

(52) U.S. Cl. ................. 180/218; 180/89.13; 180/89.14; 180/6.5; 180/327; 180/328; 180/65.8

(58) Field of Classification Search ................ 180/218, 180/89.13, 89.14, 6.5, 327, 328, 65.8
See application file for complete search history.

(56) References Cited

U.S. PATENT DOCUMENTS

| | | | | |
|---|---|---|---|---|
| 5,971,091 A | * | 10/1999 | Kamen et al. ................ | 180/218 |
| 6,050,357 A | * | 4/2000 | Staelin et al. ............... | 180/65.1 |
| 6,061,615 A | * | 5/2000 | Karthaeuser .................. | 701/37 |
| 6,288,505 B1 | * | 9/2001 | Heinzmann et al. ......... | 318/139 |
| 6,367,817 B1 | * | 4/2002 | Kamen et al. ............ | 280/5.507 |
| 6,408,240 B1 | | 6/2002 | Morrell et al. | |
| 6,543,564 B1 | | 4/2003 | Kamen et al. | |

(Continued)

FOREIGN PATENT DOCUMENTS

DE          36 26 322          2/1988

(Continued)

*Primary Examiner*—Lesley Morris
*Assistant Examiner*—Marlon A Arce
(74) *Attorney, Agent, or Firm*—Oblon, Spivak, McClelland, Maier & Neustadt, L.L.P.

(57) ABSTRACT

In a coaxial two-wheeled vehicle, an attitude controller (84) calculates motor torque Tgyr for maintaining a base so that it has a target angle from deviation between base angle command θref serving as attitude command and current base angle $θ_0$ calculated by using a gyro sensor (13) and an acceleration sensor (14). On the other hand, at a position proportional controller (86R), a differentiator (88R) and a velocity proportional controller (89R), there is performed PD control with respect to deviation between rotation position command Prefr of a motor rotor (92R) for right wheel and current rotation position θr of a motor rotor (92R). A current control amplifier (91R) generates motor current on the basis of added value of motor torque which is the control result and estimated load torque $T_1$ calculated by using pressure sensors to drive the motor rotor (92R).

21 Claims, 21 Drawing Sheets

U.S. PATENT DOCUMENTS 6,799,649 B2 * 10/2004 Kamen et al. ................. 180/8.2
6,929,080 B2 *  8/2005 Kamen et al. ............ 180/89.14

FOREIGN PATENT DOCUMENTS

| | | |
|---|---|---|
| JP | 63-275913 | 11/1988 |
| JP | 64-7109 | 1/1989 |
| JP | 7-160995 | 6/1995 |
| JP | 8-87324 | 4/1996 |
| JP | 8-133170 | 5/1996 |
| JP | 10-23613 | 1/1998 |

* cited by examiner

COAXIAL MOTORCYCLE

TECHNICAL FIELD

The present invention relates to a coaxial two-wheeled vehicle comprising wheels at both ends of the same axle.

This Application claims priority of Japanese Patent Application No. 2003-168224, and Japanese Patent Application No. 2003-168226, which are filed on Jun. 12, 2003, the entireties of which are incorporated by reference herein.

BACKGROUND ART

Studies of coaxial two-wheeled vehicles comprising wheels at the same wheel axle (shaft) have been conventionally developed because these coaxial two-wheeled vehicles are advantageous from viewpoint of realization of compact configuration in plane shape even as compared to not only four-wheeled vehicle or three-wheeled vehicle, but also different axial two-wheeled vehicle in which rotation shafts (axles) of individual wheels are different like bicycle. However, as long as the problem of stable control of attitude cannot be overcome even in such coaxial two-wheeled vehicle, putting into practice thereof is impossible.

From reasons as described above, as a technique of performing stable control of attitude, e.g., in the Japanese Patent Application Laid Open No. 1988-305082 publication, there is proposed a technology to perform, at short time interval, sampling of inclination (tilt) angles of vehicle body detected by rotary encoder, etc. to calculate control torques of motors for driving wheels on the basis of sampled values, and to instruct the wheel drive motors to perform operations corresponding to the control torques to thereby immediately move, when the vehicle body is inclined, wheels in inclination direction thereof to perform restoration of the vehicle body.

Moreover, in the U.S. Pat. No. 5,871,091 specification, there is proposed a technology to detect inclination (tilt) angle of a vehicle body by plural gyro sensors to perform feedback of the state of the control unit of the motors so that these gyro sensor signals are caused to be horizontal to thereby travel in the state where the vehicle body is maintained to be horizontal.

However, in such coaxial two-wheeled vehicles described in the Japanese Patent Application Laid Open No. 1988-305082 publication and the U.S. Pat. No. 5,871,091 specification, in the case where the human being is ridden, or in the case where the human beings having large weight difference are alternatively ridden, inertia moment and/or load weight when viewed from the motor are changed to much degree so that the control system for stabilizing the attribute becomes unstable. For this reason, there were problems that extraordinary vibration may take place when the human being rides or alights, and/or the operation may be changed by difference between weights of human beings.

Further, there is the problem that the vehicle body may be advanced or reversed by slight movement of center of gravity that a person who rides on the vehicle (hereinafter simply referred to as rider) does not intend. In addition, when position of center of gravity is moved greatly toward forward or backward direction, there was the possibility that the vehicle velocity is excessively increased so that it may fall down.

DISCLOSURE OF THE INVENTION

The present invention has been proposed in view of such conventional actual circumstances, and its object is to provide a coaxial two-wheeled vehicle which is stable with respect to change in load weight, and which can stably and compatibly realize attitude control and traveling control.

Another object of the present invention is to provide a coaxial two-wheeled vehicle which can travel in safety and stably even if position of center of gravity of rider is moved.

To attain the above-described objects, the coaxial two-wheeled vehicle according to the present invention is directed to a coaxial two-wheeled vehicle comprising a pair of wheels, a wheel axle installed or provided between the pair of wheels, a base supported on the wheel axle so that it can be inclined thereon, a pair of drive motors for driving the pair of respective wheels, and a control unit for sending an operation command to the pair of drive motors, wherein load detecting means for detecting position and weight on the base and angle detecting means for detecting angle about the wheel axle of the base are provided on the base, and the control unit is composed of a first control mechanism adapted to generate a first torque for canceling torque based on the load and a second torque for maintaining the base so that it has a predetermined angle in correspondence with angle about the wheel axle of the base, and a second control mechanism independent of the first control mechanism, which is adapted to generate a third torque for performing traveling operation in accordance with position of the load, thus to instruct the pair of drive motors to perform operations corresponding to the first to third torques.

In such coaxial two-wheeled vehicle, there are produced first torque for canceling torque based on load on the base, which has been detected by load detecting means comprised of, e.g., plural pressure sensors, second torque for maintaining the base so that it has a predetermined angle in correspondence with angle about the wheel axle of the base, which has been detected by angle detecting means composed of, e.g., gyro sensor and acceleration sensor, and third torque for performing traveling operation in accordance with the position of the load, thus to instruct pair of respective drive motors to perform operations corresponding to the first to third torques to drive the pair of wheels.

Moreover, in order to attain the above-described objects, the coaxial two-wheeled vehicle according to the present invention is directed to a coaxial two-wheeled vehicle comprising a pair of wheels, a wheel axle installed or provided between the pair of wheels, a base supported on the wheel axle so that it can be inclined thereon, a pair of drive motors attached on the base and for driving the pair of respective wheels, and a control unit for sending an operation command to the pair of drive motors, wherein load detecting means for detecting position and weight of load on the base is provided on the base, and the control unit is operative so that in the case where position of the load is within a predetermined stop region, it does not a traveling command, while in the case where position of the load is not within the stop region, it sends a traveling command corresponding to that position to the pair of respective drive motors.

In such coaxial two-wheeled vehicle, in the case where the position of load on the base is within a predetermined stop region, e.g., the range in a direction perpendicular to the wheel axle is inside of the range in a direction perpendicular to the wheel axle of ground-contacting region where the pair of wheels are in contact with the road surface, it does not send the traveling command, while in the case where such position is not within the stop region, it sends traveling command corresponding to that position.

Further, in order to attain the above-described objects, the coaxial two-wheeled vehicle according to the present invention is directed to a coaxial two-wheeled vehicle comprising a pair of wheels, a wheel axle installed or provided between the pair of wheels, a base supported on the wheel axle so that it can be inclined thereon, a pair of drive motors attached on the base and for driving the pair of respective wheels, and a control unit for sending an operation command to the pair of drive motors, wherein load detecting means for detecting position and weight of load is provided on the base, and the control unit is operative so that in the case where position of the load is within a predetermined deceleration region, it sends a traveling instruction to perform deceleration/stop operation to the pair of respective drive motors, while in the case where position of the load is not within the deceleration region, it sends a traveling command corresponding to that position to the pair of respective drive motors.

In such coaxial two-wheeled vehicle, in the case where position of load on the base is within a predetermined deceleration region, e.g., within the region in the vicinity of the boundary of load detectable range by the load detecting means, traveling instruction to perform deceleration/stop operation is sent, while in the case where such position is not within the deceleration region, it sends traveling command corresponding to that position.

Still further objects of the present invention and practical merits obtained by the present invention will become more apparent from the description of the embodiments which will be given below.

BRIEF DESCRIPTION OF THE DRAWINGS

FIGS. 3A and 3B are views showing pressure sensor provided at the base of the coaxial two-wheeled vehicle, wherein FIG. 3A shows a plan view and FIG. 3B shows a side view.

FIGS. 21A and 21B are views for explaining a velocity control method in the case where acceleration signal in Z-axis direction is detected, wherein FIG. 21A is a view showing the state where vehicle body rides on offset, and FIG. 21B is a view showing changes of traveling velocity and Z-axis acceleration.

FIGS. 22A and 22B are views for explaining image recognition processing in the coaxial two-wheeled vehicle, wherein FIG. 22A is a view showing CCD camera provided on the base, and FIG. 22B is a view showing the state of obstacle detection by the CCD camera.

FIGS. 23A and 23B are views for explaining sound (speech) recognition processing in the coaxial two-wheeled vehicle, wherein FIG. 23A is a view showing microphone provided on the base, and FIG. 23B is a view showing the state of sound source detection by the microphone.

BEST MODE FOR CARRYING OUT THE INVENTION

Practical embodiments to which the present invention is applied will now be described in detail with reference to the attached drawings. In this embodiment, the present invention is applied to a coaxial two-wheeled vehicle comprising wheels at both ends of the same axle (shaft).

Figure 1:
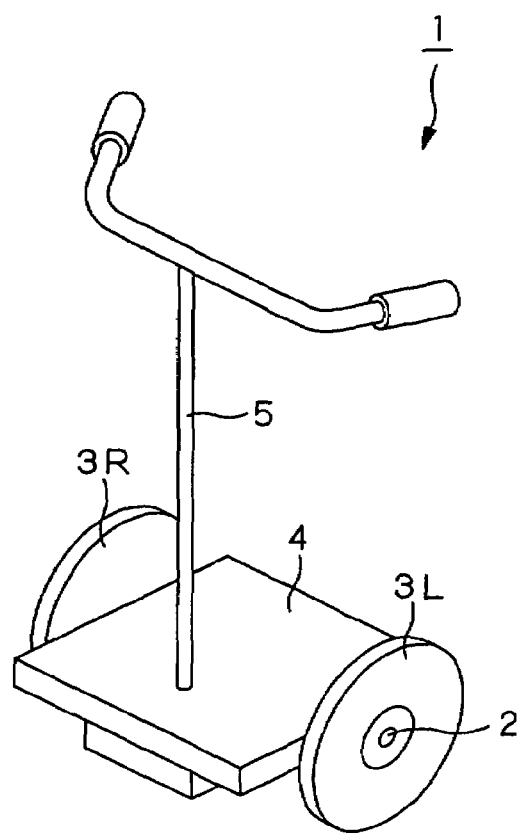
FIG. 1 is an outer appearance perspective view showing a coaxial two-wheeled vehicle in this embodiment.

Initially, outer appearance view of the coaxial two-wheeled vehicle in this embodiment is shown in FIG. 1. In the coaxial two-wheeled vehicle 1 shown in FIG. 1, a pair of wheels 3 (right wheel 3R and left wheel 3L) are fixedly attached at both ends of a wheel axle 2. The wheel 3 is formed by rubber material having elastic characteristic, wherein air or nitrogen gas, etc. is filled within the wheel 3. By adjusting gas pressure to adjust elasticity of the wheel 3, vibration of the vehicle body is absorbed, thereby making it possible to reduce vibration by uneven portions of the road surface and/or impact by offset. Moreover, although not shown, grooves having uneven shape are formed at the surface of the wheel 3. Thus, it is possible to maintain high friction force at the time of traveling operation on uneven road surface, and/or riding over an offset.

Moreover, at the wheel axle 2, e.g., a base 4 on which substantially parallelepiped case where control unit, etc. which will be described later is accommodated below plate-shaped body adapted so that, e.g., the human being is ridden in the standing attitude is supported so that it can be inclined about the wheel axle 2. On the base 4, there is provided a handle 5 adapted to be grasped by both hands when, e.g., the human being is ridden.

Hereinafter, in this specification, the intermediate point of the wheel axle 2 connecting the both wheels is assumed as origin O of the X-Y-Z coordinate system, and the direction passing though the origin O and in parallel to the principal surface of the base 4 and perpendicular to the wheel axle 2 is defined as X-axis or roll axis, and wheel axle (shaft) direction passing through the origin O is defined as Y-axis or pitch axis, and the direction passing through the origin O and perpendicular to the principal surface of the base 4 is defined as yaw axis. In addition, the forward direction of the coaxial two-wheeled vehicle 1 is defined as positive direction of the X-axis, the left direction thereof is defined as positive direction of the Y-axis, and the upper direction of the Z-axis is defined as positive direction of the Z-axis.

Figure 2:
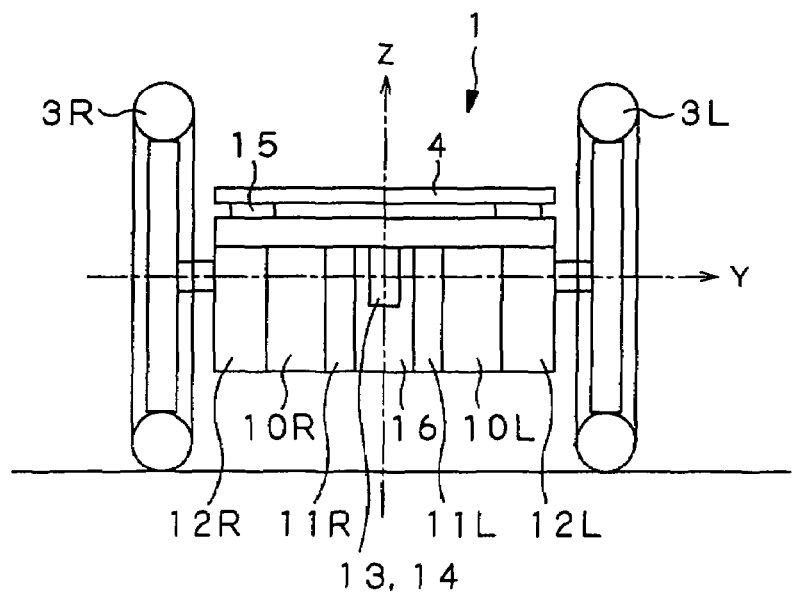
FIG. 2 is a side cross sectional view for explaining base of the coaxial two-wheeled vehicle.

As shown in FIG. 2, reversible motors (10R and 10L) are attached on the base 4. Rotary encoders 11 (11R and 11L) for detecting rotational position of the motor 10 are provided in a manner adjacent to the motor 10. Moreover, decelerators 12 (12R and 12L) comprised of toothed wheel or timing belt are caused to intervene between the motor 10 and the wheel 3. Thus, rotation of the motor 10 is transmitted to the wheel 3 through the decelerators 12 and joints (not shown).

The decelerator 12 has backlash quantity of one minute or less, and has the characteristic (back drivability characteristic) in which when rotational torque is applied by external force from the output shaft of the wheel 3 side, rotation torque is transmitted also to the input shaft of the motor 10 side so that the motor 10 is easily rotated. By using such decelerator 12 having back-drivability characteristic, when landing down from, e.g., air state, the motor 10 absorbs reactive force of the road surface so that it is attenuated. Thus, landing can be stably performed. Moreover, even in the case where power supply is interrupted, external force is applied to the vehicle body to rotate the motor 10, thus making it possible to easily move the vehicle body. Further, in the case where the vehicle body descends in accordance with gravity of slope, rotation torque is transmitted to the motor 10 so that counter electromotive force takes place. However, charging operation of battery (not shown) is performed by making use of this counter electromotive force, thus making it possible to elongate battery drive time. It is to be noted that in the case where the battery is completely charged, a control to discharge regenerative power as heat by regenerative resistance is performed. In addition, there is included power supply management circuit (which will be described later) such that not only regenerative power produced at down slope, but also regenerative power at the time of deceleration are charged into the battery.

Further, at the base 4, there are included, in addition to gyro sensor 13 for detecting pitch axis, and angular velocities ωp, ωyaw of the base 4, various sensors such as acceleration sensors 14 for detecting linear accelerations Ax, Ay, Az in X, Y, Z axis directions, and angular accelerations αp, αr, αyaw about the pitch axis, the roll axis and the yaw axis, and a pressure sensor 15 for detecting load weight on the base 4, etc.

Figure 3A:
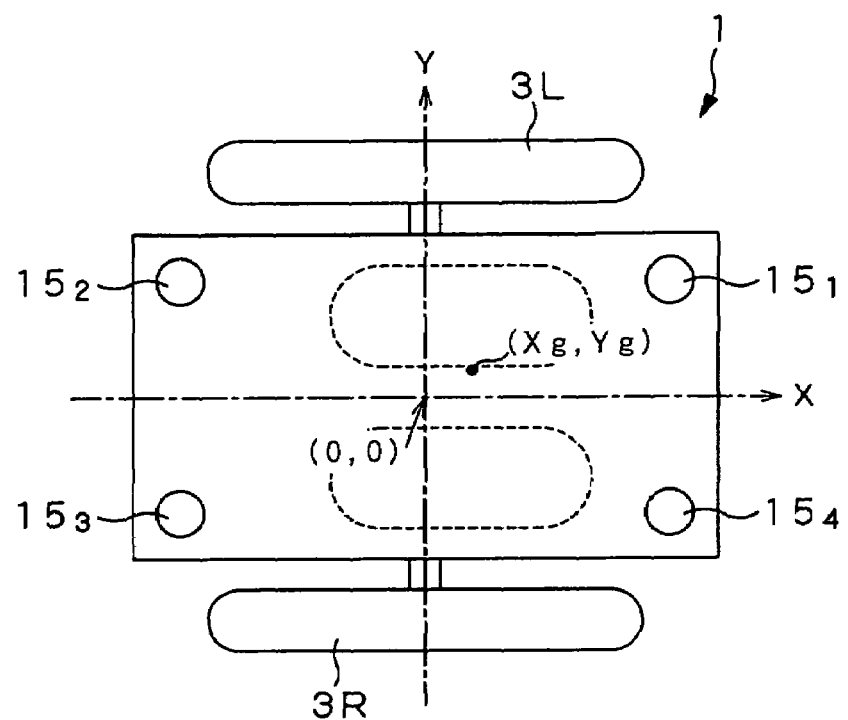
Figure 3B:
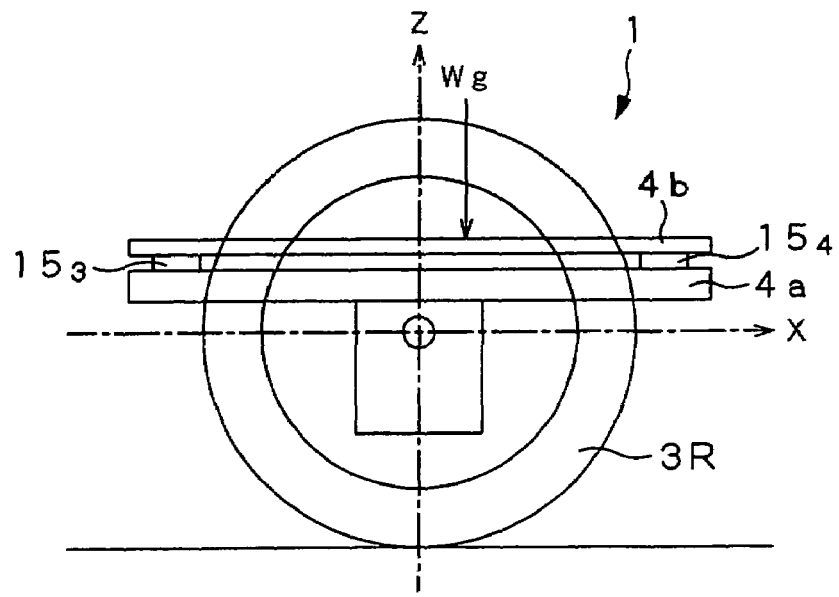

Among them, as shown in the plan view of FIG. 3A and the side view of FIG. 3B, the pressure sensors 15 are provided at four corners between supporting table 4a and movable table 4b which constitute plate-shaped body of the base 4, thus making it possible to detect gravity center coordinate $(X_g, Y_g)$ of load on the base 4 and its load weight $W_g$ from sensor signals of the four pressure sensors $15_1$ to $15_4$. Namely, in the case where sensor signals of the pressure sensors $15_1$ to $15_4$ are respectively $PS_1$, $PS_2$, $PS_3$, $PS_4$, and self-weights applied to the pressure sensors $15_1$ to $15_4$ in no-load state are $W_0$, load weight Wg is calculated by the following formula.

$$W_g = PS_1 + PS_2 + PS_3 + PS_4 - W_0 \qquad (1)$$

Moreover, in the case where X-coordinates of the pressure sensors $15_1$, $15_4$ and the pressure sensors $15_2$, $15_3$ are respectively Xps, −Xps, and Y-coordinates of the pressure sensors $15_1$, $15_2$ and the pressure sensors $15_3$, $15_4$ are respectively Yps, −Yps, gravity coordinate $(X_g, Y_g)$ is determined by the following formula (2). Here, in the formula (2), $W_{14}$ indicates self-weight applied to the pressure sensors $15_1$, $15_4$ in no-load state, $W_{23}$ indicates self-weight applied to the pressure sensors $15_2$, $15_3$ in no-load state, $W_{12}$ indicates self-weight applied to the pressure sensors $15_1$, $15_2$ in no-load state, and $W_{34}$ indicates self-weight applied to the pressure sensors $15_3$, $15_4$ in no-load state.

$$\begin{cases} X_g = X_{PS} * (W1 - W2)/(W1 + W2) \\ Y_g = Y_{PS} * (W3 - W4)/(W3 + W4) \end{cases}$$

where $$\begin{cases} W1 = (PS_1 + PS_4)/2 - W_{14} \\ W2 = (PS_2 + PS_3)/2 - W_{23} \\ W3 = (PS_1 + PS_2)/2 - W_{12} \\ W4 = (PS_3 + PS_4)/2 - W_{34} \end{cases} \qquad (2)$$

Since load torque $T_1$ based on load on the base 4 is calculated by the pressure sensor 15, moment of reaction is given to the motor 10, thereby making it possible to maintain balance on the base 4 to stabilize attitude.

Furthermore, a control unit 16 comprised of microcomputer is mounted at the lower case of the base 4, and various sensor signals and detection signals are inputted to the control unit 16. The control unit 16 controls the vehicle body so as to produce motor torque serving to advance, reverse or swivel the vehicle body while maintaining pitch axis angle and yaw axis angle of the base 4 at suitable values as described later.

Figure 4:
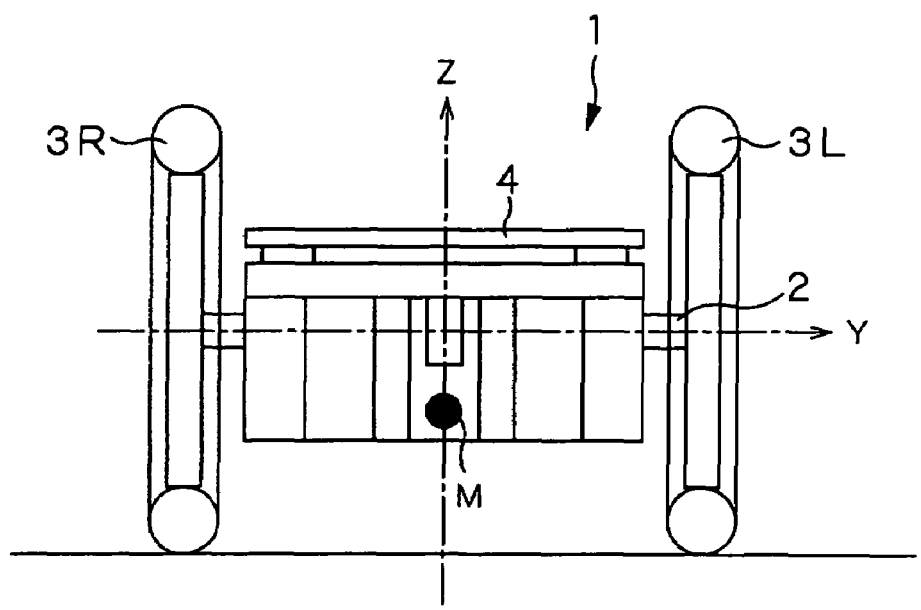
FIG. 4 is a view showing positional relationship between center of weight and wheel axle of the coaxial two-wheeled vehicle.

In addition, as shown in FIG. 4, the coaxial two-wheeled vehicle 1 is caused to be of the configuration in which weight center M of the base 4 (and the handle 5) which can be inclined about the wheel axle (shaft) 2 is positioned below the wheel axle 2. Thus, also at the time of stop, the vehicle body is maintained so that gravity position is located at the most stable position, and is difficult to fall down. It is to be noted that while the height of the upper surface of the base 4 is higher than the wheel axle 2 in FIG. 4, the upper surface of the base 4 may be lower than the wheel axle 2.

Figure 5:
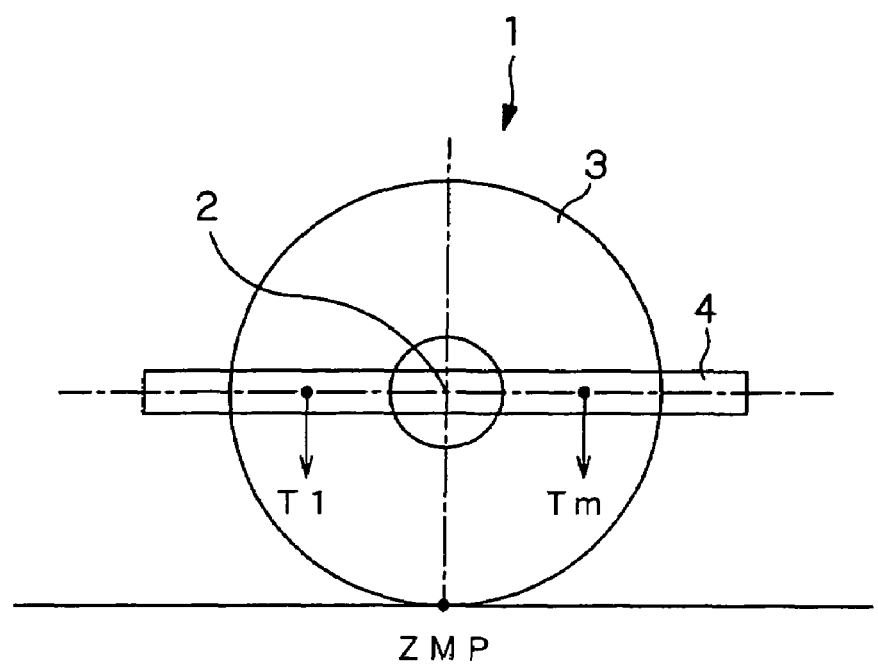
FIG. 5 is a view for explaining balance between load torque and motor torque.
Figure 6:
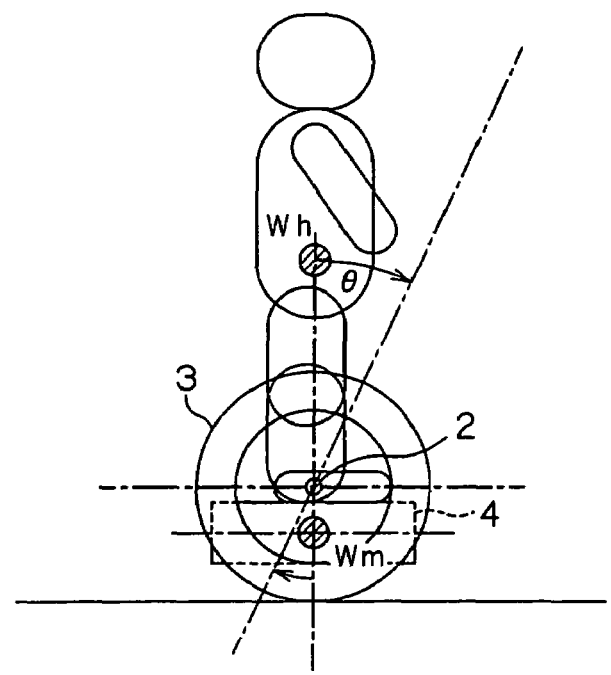
FIG. 6 is a view for explaining attitude control in the case where the human being is ridden.

Here, the control concept for maintaining the attitude on the base 4 will be explained. As shown in FIG. 5, when motor torque Tm is controlled so that the same moment is produced with respect to load torque $T_1$ based on load on the base 4, e.g., load torque $T_1$ by, e.g., weight of the human being, balance of the base 4 is maintained with fulcrum being as center like seesaw. The point corresponding to fulcrum which maintains the balance, i.e., the point where rotational moment about the wheel axle 2 becomes equal to zero is called ZMP (Zero Moment Point). When the ZMP coincides with ground contacting point with respect to the road surface of the wheel 3, or is located within the ground contacting surface with respect to the road surface, the balance is kept, thus making it possible to maintain the attitude on the base 4.

When the human being having weight Wh is ridden on the coaxial two-wheeled vehicle 1, weight center M of the base 4 and the handle 5 is inclined with the wheel axle 2 being as center in accordance with inclination angle θ of the human being. At this time, the wheel axle torque $T_0$ that the wheel axle 2 takes balance is represented by the following formula (3), and motor torque Tm for maintaining attitude is represented as $T_0/N$ when deceleration ratio of the decelerator 12 is expressed as N:1.

$$T_0 = Wh * \sin θ − Wm * \sin θ \qquad (3)$$

In the coaxial two-wheeled vehicle 1 in this embodiment, since weight center M of the base 4 and the handle 5 is constituted as described above so that it is positioned below the wheel axle 2, it is sufficient to only add, as wheel axle torque $T_0$, difference between moment based on weight Wh of the human being and moment based on weight Wm of the base 4 and the handle 5. Thus, it is possible to maintain balance by relatively small motor torque.

Figure 7:
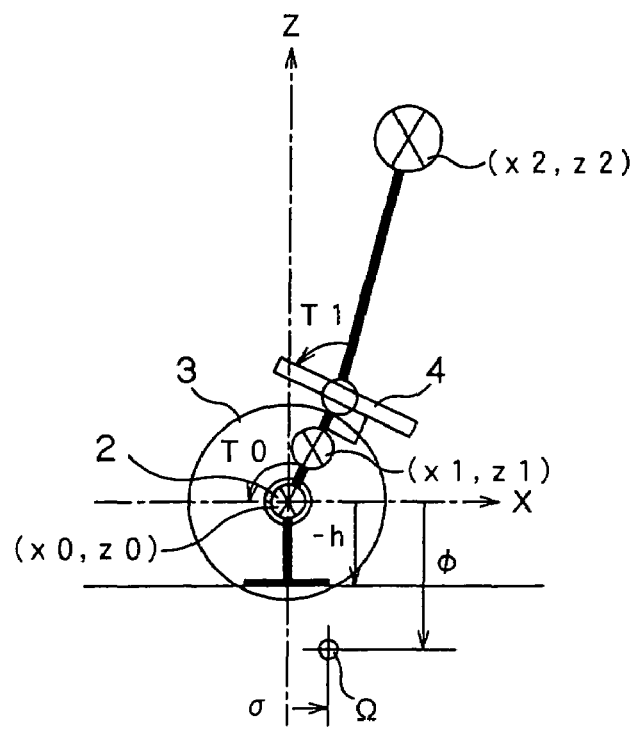
FIG. 7 is a view for explaining dynamical model for maintaining attitude on base.

The dynamical model for maintaining the attitude on the base 4 will be explained in more detail by using the X-Z coordinate system shown in FIG. 7. Here, in FIG. 7, for the brevity, explanation will be given on the premise that single wheel 3 is provided. Moreover, the wheel 3, the base 4 and the human being on the base 4 are respectively regarded as links, and their gravity position coordinates are respectively expressed as $(x_0, z_0)$, $(x_1, z_1)$ and $(x_2, z_2)$. Further, masses of the respective links are respectively expressed as $m_0$, $m_1$, $m_2$, and inertia moments are respectively as $I_0$, $I_1$, $I_2$.

When gravity center position coordinate is expressed as $(x_i, z_i)$, respective momentums of the i-th link (i=0, 1, 2) about the defined point $\Omega(\sigma, \phi)$ are represented by the following formula (4). Here, in the formula (4), respective single dots attached over x, z indicate first order differentiation of x, z.

$$Ii*\omega i + mi*\dot{x}i(\phi - zi) - mi*\dot{z}i(\sigma - xi) \tag{4}$$

Accordingly, moment by inertia force of all links is represented by the following formula (5). Here, respective two dots attached over x, z in the formula (5) indicate second order differentiation of x, z. In addition, when gravity acceleration is g, moment by gravity of all links is represented by the following formula (6).

$$\sum_{i=0}^{n}(Ii*\omega i + mi*\ddot{x}i(\phi - zi) - mi*\ddot{z}i(\sigma - xi)) \tag{5}$$

$$\sum_{i=0}^{n}mi(\sigma - xi)g \tag{6}$$

By sum of moment by this inertia force and moment by gravity, moment $M\Omega$ about the point $\Omega(\sigma, \phi)$ is given as shown in the following formula (7).

$$M\Omega = \sum_{i=0}^{n} Ii*\omega i + \sum_{i=0}^{n} mi(\ddot{x}i(\phi - zi) - \ddot{z}i(\sigma - xi) + \sum_{i=0}^{n} mi(\sigma - xi)g \tag{7}$$

If moment by gravity of wheel 3 which is mass $m_0$ is excluded, point $\Omega(\sigma, \phi)$ is taken as origin so that the above-described moment $M\Omega$ results in moment Ma about the wheel axle 2. The moment Ma about the wheel axle 2 is represented by the following formula (8), $$Ma = \sum_{i=0}^{n} Ii*\omega i + \sum_{i=0}^{n} mi(\ddot{z}i*xi - \ddot{x}i*zi) - \sum_{i=0}^{n} mi*xi*g \tag{8}$$

If the above-described moment $M\Omega$ is represented by using this moment Ma, when $x_0=0$, i.e., gravity center position of the wheel 3 exists on the wheel axle 2, the moment $M\Omega$ is given by the following formula (9).

$$M\Omega = Ma - \sum_{i=0}^{n} mi(\ddot{z}i - g)\sigma + \sum_{i=0}^{n} mi*\ddot{x}i*\phi \tag{9}$$

Here, ZMP is defined as point on the floor surface where moment $M\Omega$ is 0 (zero). In view of the above, height of the wheel axle 2 is expressed as h and coordinate of ZMP is expressed as $(\sigma zmp, -h)$ to substitute these values into the formula (7), the following formula (10) is provided. By solving this formula (10) with respect to $\sigma zmp$, it is possible to represent ZMP by link position, acceleration and mass.

$$0 = \sum_{i=0}^{n} Ii*\omega i + \sum_{i=0}^{n} mi(-\ddot{x}i(h+zi) - \ddot{z}i(\sigma zmp - xi)) + \sum_{i=0}^{n} mi(\sigma zmp - xi)g \tag{10}$$

Moreover, when coordinate $(\sigma zmp, -h)$ of ZMP is substituted into the above-described formula (9), the following formula (11) is provided. In this case, the formula (11) indicates the formula of balance of moment about the wheel axle 2.

$$0 = Ma - \sum_{i=0}^{n} mi(\ddot{z}i - g)\sigma zmp - \sum_{i=0}^{n} mi*\ddot{x}i*h \tag{11}$$

Figure 8:
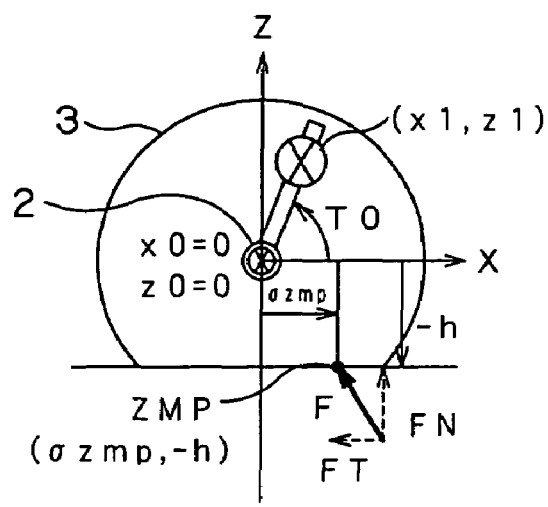
FIG. 8 is a view for explaining dynamical model for maintaining attitude on the base.

Here, force exerted on ZMP is shown in FIG. 8. In FIG. 8, FN indicates floor reactive force, FT indicates rolling friction force, and F indicates resultant vector of FN and FT. It is to be noted that while floor reactive forces N are distributed in practice over the entirety of ground contacting surface of the wheel 3, those forces are intensively concentrated into ZMP. When the formula of balance of moment about the wheel axle 2 is represented from this figure, the following formula (12) is provided.

$$FN*\sigma zmp + FT*h + \tau 0 = 0 \tag{12}$$

In this case, when the following formulas (13) to (15) are substituted into the formula (12), the formula which is the same as the above-described formula (11) is provided.

$$T_0 = Ma \tag{13}$$

$$FN = -\sum_{i=0}^{n} mi(\ddot{z}i - g) \tag{14}$$

$$FT = -\sum_{i=0}^{n} mi*\ddot{x}i \tag{15}$$

In order that attitude on the base 4 is stabilized, it is sufficient that $\sigma zmp=0$ in the formula (12). Namely, if wheel axle torque $T_0 = -FT*h$ holds, it is possible to maintain the attitude. Accordingly, by controlling state variable shown in the following formula (16) which satisfies $T_0 = FT = 0$, it is possible to stabilize the attitude.

$$(xi, \dot{x}i, \ddot{x}i) = (0, 0, 0) \tag{16}$$

At this time, $x_0$, $x_1$ are univocally determined by the mechanical structure, but $m_2$, $I_2$, $x_2$, $z_2$ are infinite values because of the human being. Moment Mt on the base 4 by $m_2$, $I_2$, $x_2$, $z_2$ is given by the following formula (17). It is to be noted that the base is assumed to be kept horizontal as shown in FIG. 9.

$$Mt = I_2*\dot{\omega}_2 + m_2*\ddot{z}_2*x_2 - m_2*\ddot{x}_2*(z_2-L) - m_2*x_2*g \tag{17}$$

Here, in the case where load is human being, since angular velocity $\omega_2$ is sufficiently small, when approximation into $\omega 2 \approx 0$ is made, moment Mt becomes equal to zero when $x_2$ and the second-order differential value are caused to be zero in the formula (18). It can be considered that allowing $x_2$ and the second-order differential value thereof to be equal to zero is equivalent to the fact that control of $x_0$ and $x_1$ is made so that load torque $T_1$ on the base 4 becomes equal to zero. Moreover, the moment Mt by the load torque $T_1$ is equivalent to the fact that force $F_2$ is exerted on working point $(x_f, L)$ on the base 4. Accordingly, if $z_0$, $x_1$ which allow the $x_f$ to be equal to zero can be given, $T_1$ becomes equal to 0 (zero). Thus, it is possible to satisfy the condition which stably maintains the attitude.

Figure 9:
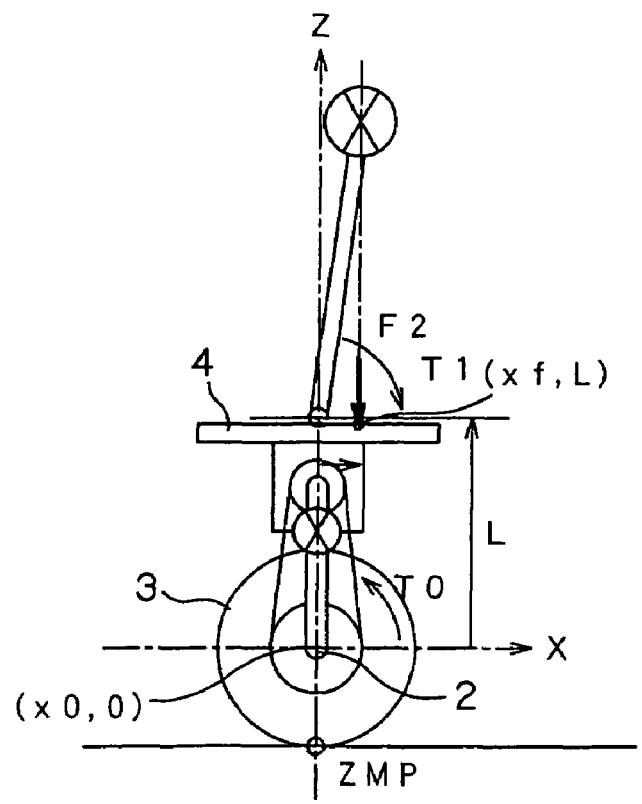
FIG. 9 is a view for explaining dynamical model for maintaining attitude on the base.

As shown in FIG. 9, when feedback control of a gyro sensor signal on the base 4 is performed to give motor torque Tm so that control is made in order to maintain $x_0 = x_1$, motor torque Tm is controlled so that there results $x_f = x_0$, thereby making it possible to stably maintain the attitude.

In concrete terms, when error is expressed as $E_f = x_f - x_0$, if $E_f > 0$, the motor torque Tm is caused to be negative for the purpose of performing displacement of $x_0$ in a positive direction to advance the vehicle body. If $E_f < 0$, motor torque Tm is caused to be positive for the purpose of performing displacement of $x_0$ in a negative direction to reverse (withdraw) the vehicle body, thereby making it possible to converge error $E_f$ into zero. Namely, $A_0$ is caused to be positive constant to give motor torque Tm such that $Tm = -A_0 * E_f$ to thereby converge $E_f$ into zero, thereby making it possible to suitably maintain the attitude.

Figure 10:
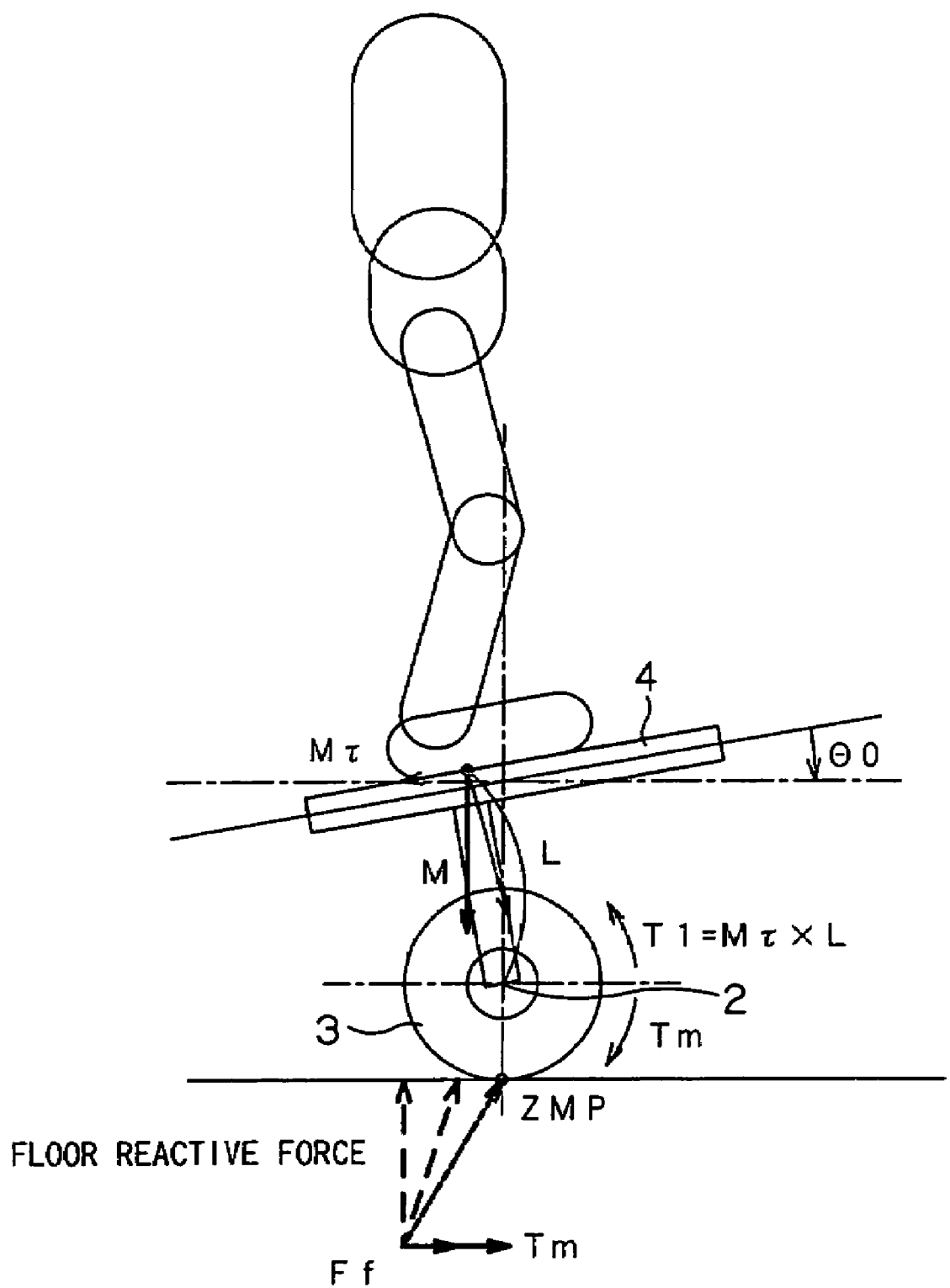
FIG. 10 is a view for explaining dynamical model in the coaxial two-wheeled vehicle.

In practice, e.g., in the case where the base 4 is inclined by angle $\theta_0$ about the pitch axis as shown in FIG. 10, since load torque of $T_1 (= Mt \times L)$ is produced by the human being having weight W, motor torque Tm is controlled in order to provide load torque $T_1$ and wheel shaft torque $T_0$ in a direction opposite to the above to thereby allow ZMP to be in correspondence with ground-contacting point of the wheel 3 to have ability to stably maintain the attitude.

Here, in the case where the human being is ridden on the base 4, since force exerted on the back of the foot is changed in order to maintain the attitude ordinarily at period of 1 to 2 seconds although individual difference exists, load torque $T_1$ based on weight of the human being is changed in indefinite manner. Accordingly, it is required to add a torque such that balance can be taken on the real time basis to the motor 10 to keep constant angle of the base 4 with respect to load change.

Figure 11:
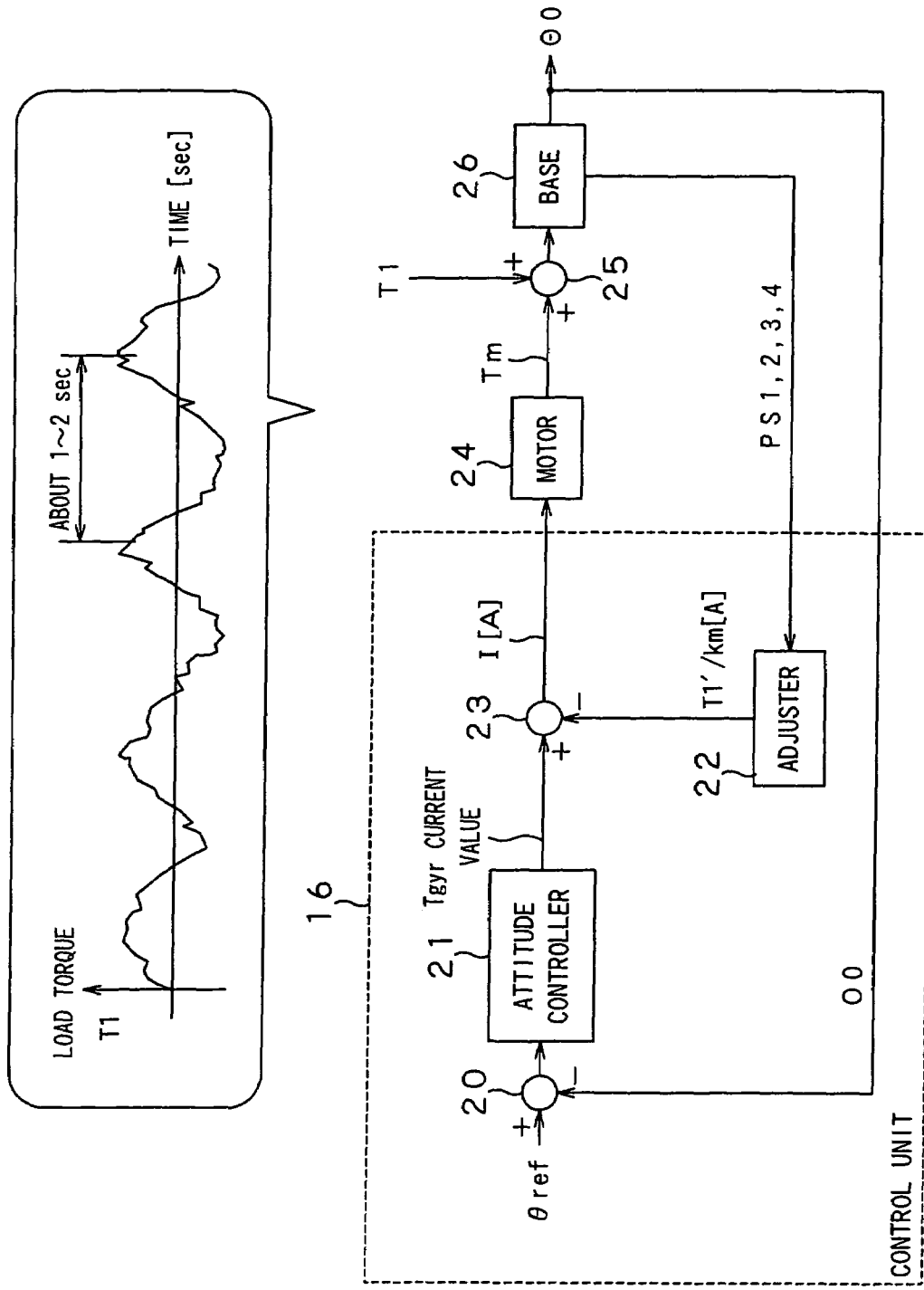
FIG. 11 is a view showing a control mechanism for attitude stabilization control.

In view of the above, in order to cancel such load change on the real time basis, the coaxial two-wheeled vehicle 1 in this embodiment has a control mechanism as shown in FIG. 11 within the control unit 16. In FIG. 11, at the subtracter 20, deviation between base angle command $\theta$ref serving as attitude command and current base angle $\theta_0$ detected by the gyro sensor 13 and the acceleration sensor is taken. The deviation thus obtained is delivered to an attitude controller 21. The attitude controller 21 calculates motor torque current valve Tgyr[A] from the base angle command $\theta$ref and current base angle $\theta_0$. Moreover, an adjuster 22 serves to estimate load torque $T_1$ by using sensor signals $PS_1$, $PS_2$, $PS_3$, $PS_4$ of the pressure sensors 15 to calculate estimated load torque current value $T_1'/Km[A]$ for canceling the load torque $T_1$. Here, Km is motor constant [Nm/A]. In the case where gravity center coordinate of load is $(X_g, Y_g)$, and load weight is $W_g$, estimated load torque $T_1'$ is given by the following formula (18).

$$T_1' = W_g * X_g / 2 \tag{18}$$

Further, at a subtracter 23, deviation between motor torque current value Tgyr and estimated load torque current value $T_1'/Km$ is taken. The deviation thus obtained is delivered to a motor 24 as motor current I[A]. The motor 24 is rotated by the motor current I. Thus, motor torque Tm is produced. At an adder 25, the motor torque Tm and load torque $T_1$ are added. The added torque thus obtained is transmitted to a base 26.

As stated above, motor torque Tm for canceling load torque $T_1$ is added to the motor 24, thereby making it possible to keep constant base angle with respect to load change at the time of stop.

While attitude stabilization control can be performed by the above-mentioned control mechanism, it is required for performing traveling operation in this state to further provide control mechanism for traveling control. In view of the above, the coaxial two-wheeled vehicle 1 in this embodiment has control mechanism of the double structure to independently determine, in practice, motor torque for attitude stabilization control and motor torque for traveling control.

Figure 12:
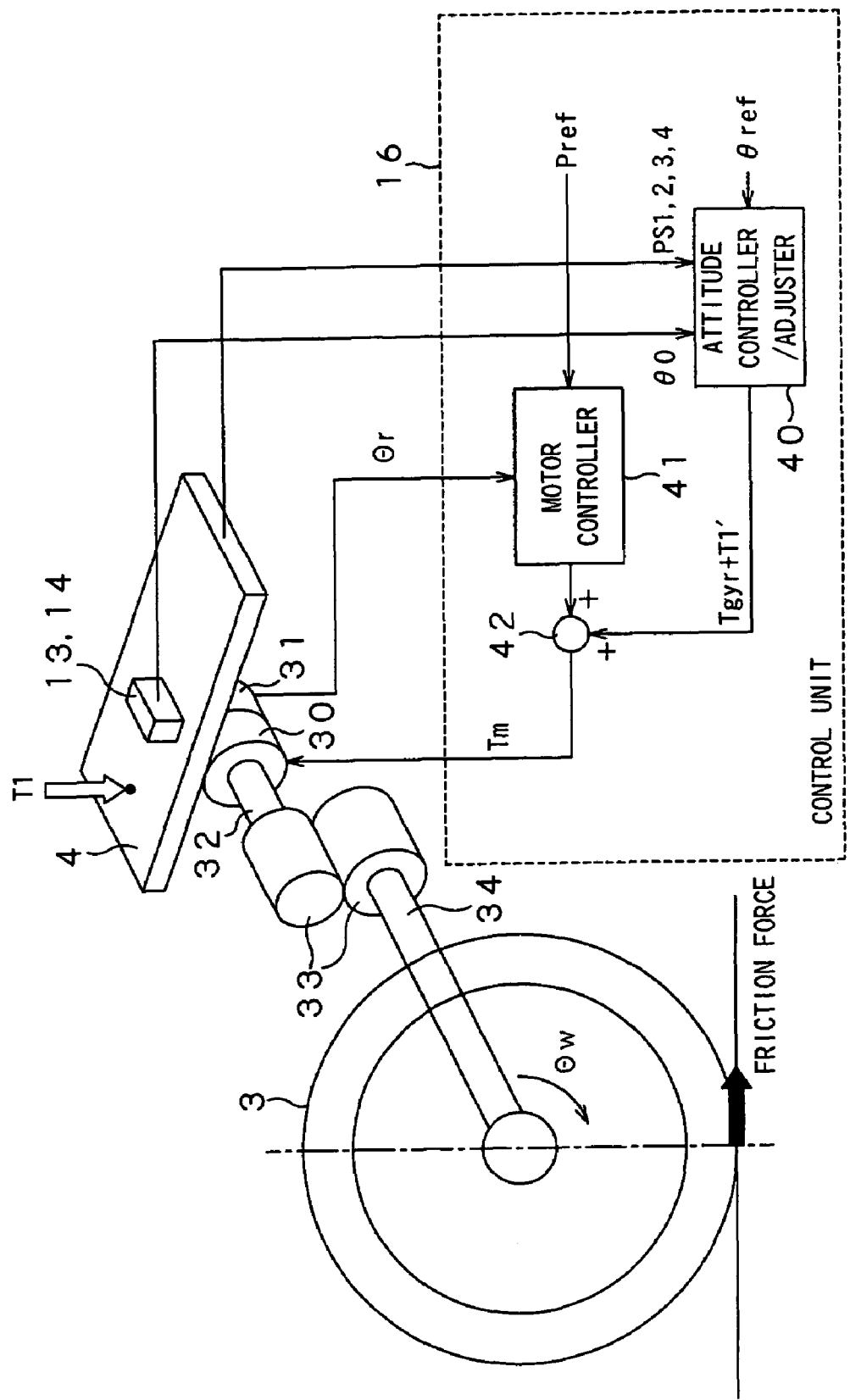
FIG. 12 is a view showing a control mechanism for attitude stabilization control and traveling control in the case where a single wheel is provided.

The physical model of such control mechanism of the double structure is shown in FIG. 12. It is to be noted that, also in FIG. 12, for the brevity, explanation will be given on the premise that single wheel 3 is provided. As shown in FIG. 12, various sensors such as gyro sensor 13, acceleration sensor 14 and/or pressure sensor 15, etc. are included within the base 4. A motor stator 30, a rotary encoder 31, and a motor rotor 32 exist at the lower portion thereof. Thus, rotation of the motor rotor 32 is transmitted to the wheel 3 through a decelerator 33 and a joint 34.

An attitude controller/adjuster 40 calculates motor torque Tgyr and estimated load torque $T_1'$ which have been described above from base angle command $\theta$ref serving as attitude command, current base angle $\theta_0$ detected by the gyro sensor 13 and the acceleration sensor 14, and sensor signals $PS_1$, $PS_2$, $PS_3$, $PS_4$ of the pressure sensors 15. Moreover, a motor controller 41 calculates motor torque for traveling operation from rotational position command Pref of the motor rotor 32 serving as traveling command and current rotation position $\theta r$ of the motor rotor 32 detected by the rotary encoder 31.

Further, at an adder 42, motor torque Tgyr, estimated load torque $T_1'$ and motor torque for traveling operation are added. The added value thus obtained is delivered to the motor rotor 32.

Here, the above-described base angle command $\theta$ref is target value of base angle which is set in accordance with acceleration Ax in the X-axis direction so that the rider can stably ride. In concrete terms, when X-axis acceleration Ax is zero, setting is made such that the base 4 is placed in horizontal direction, when X-axis acceleration Ax is positive, setting is made such that the base 4 is inclined in forward direction, and when X-axis acceleration Ax is negative, setting is made such that the base 4 is inclined in backward direction. For example, in the case where the X-axis acceleration Ax is positive, when the base 4 is inclined so that ZMP is positioned in a direction of resultant vector of inertia force and gravity, the rider can stably maintain the attitude. In this example, the base angle command $\theta$ref changes in a manner proportional to the X-axis acceleration Ax.

Figure 14:
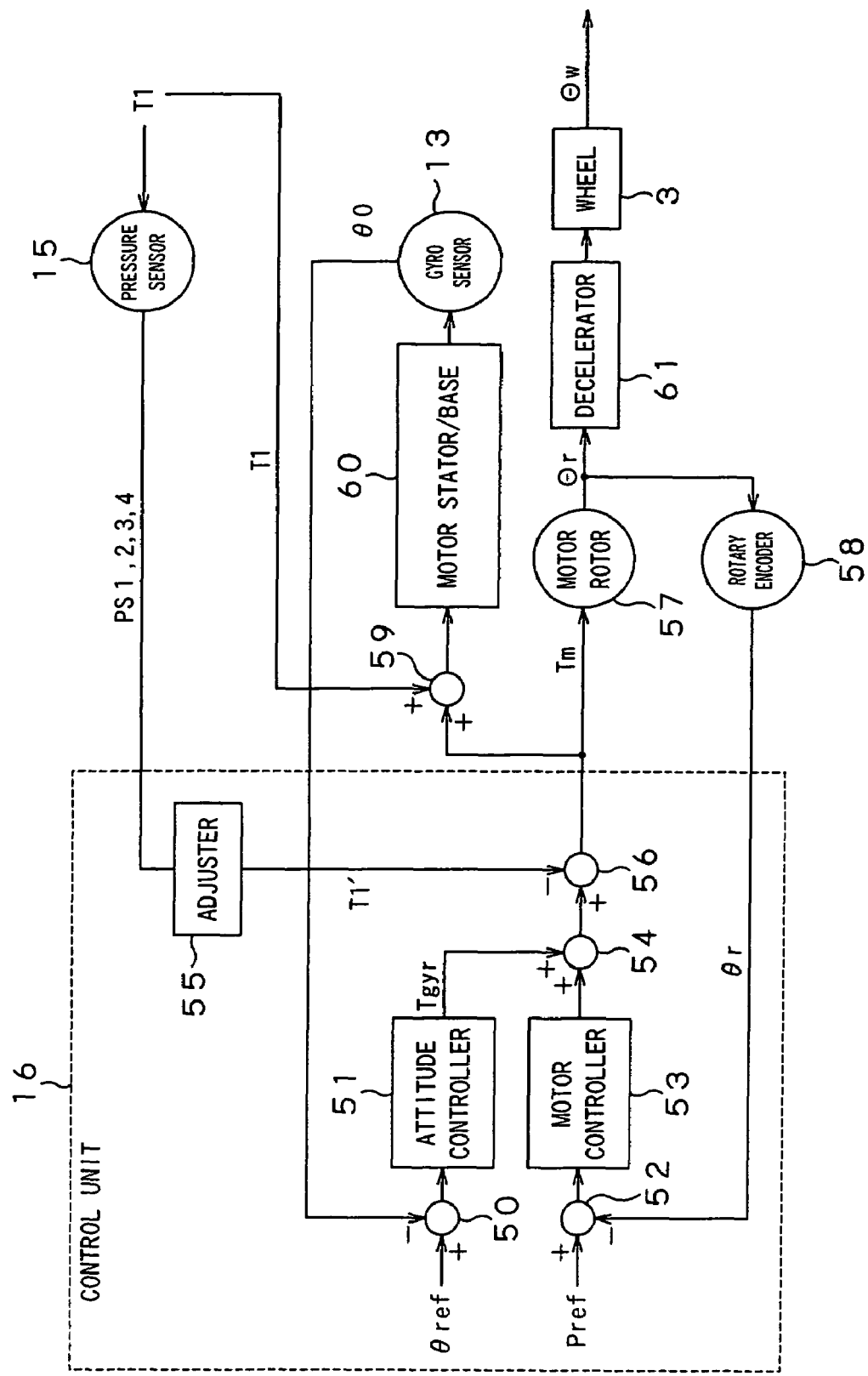
FIG. 14 is a block diagram showing control mechanism for attitude stabilization control and traveling control in the case where a single wheel is provided.

The block diagram of the control mechanism is shown in FIG. 14. At a subtracter 50, deviation between base angle command $\theta$ref serving as attitude command and current base angle $\theta_0$ detected by the gyro sensor 13 (and the acceleration sensor 14) is taken. The deviation thus obtained is delivered to an attitude controller 51. The attitude controller 51 calculates motor torque Tgyr from the base angle command $\theta$ref and current base angle $\theta_0$ to deliver the motor torque Tgyr thus calculated to an adder 54.

On the other hand, at a subtracter 52, deviation between rotational position command Pref of a motor rotor 57 serving as traveling command and current rotational position $\theta r$ of the motor rotor 57 detected by a rotary encoder 58 is taken. The deviation thus obtained is delivered to a motor controller 53. The motor controller 53 calculates motor torque for traveling operation from the rotation position command Pref and current rotational position θr to deliver the motor torque thus obtained to an adder 54.

Moreover, when load torque $T_1$ is applied to the base 4, sensor signals $PS_1$, $PS_2$, $PS_3$, $PS_4$ of the pressure sensors 15 are delivered to an adjuster 55. Thus, the adjuster 55 calculates the above-described estimated load torque $T_1'$ on the basis of these sensor signals.

At the adder 54, motor torque Tgyr from the attitude controller 51 and motor torque from the motor controller 53 are added. At a subtracter 56, estimated load torque $T_1'$ is subtracted from the added value mentioned above. The torque thus obtained results in final motor torque Tm. The motor torque Tm thus obtained is delivered to a motor rotor 57. At an adder 59, reactive force of the motor torque Tm and load torque $T_1$ are added. The added value thus obtained is delivered to a motor stator/base 60.

The motor rotor 57 is rotationally controlled in accordance with motor torque Tm. Rotational position θr of the motor rotor 57 is converted into 1/N by a deceleration 61 having deceleration ratio of N:1. The rotational position thus converted is transmitted to the wheel 3. Namely, rotational position θw of the wheels 3 is 1/N of the rotational position θr of the motor rotor 57. The rotary encoder 58 detects rotational position θr of the motor rotor 57 to deliver a detection signal to the subtracter 52.

On the other hand, since added value of reactive force of the motor torque Tm and load torque $T_1$ is applied to the motor stator/base 60 in a manner as described above, but theses values are mutually canceled, inclining (tilting) operation of the motor stator/base 60 is suppressed.

Figure 15:
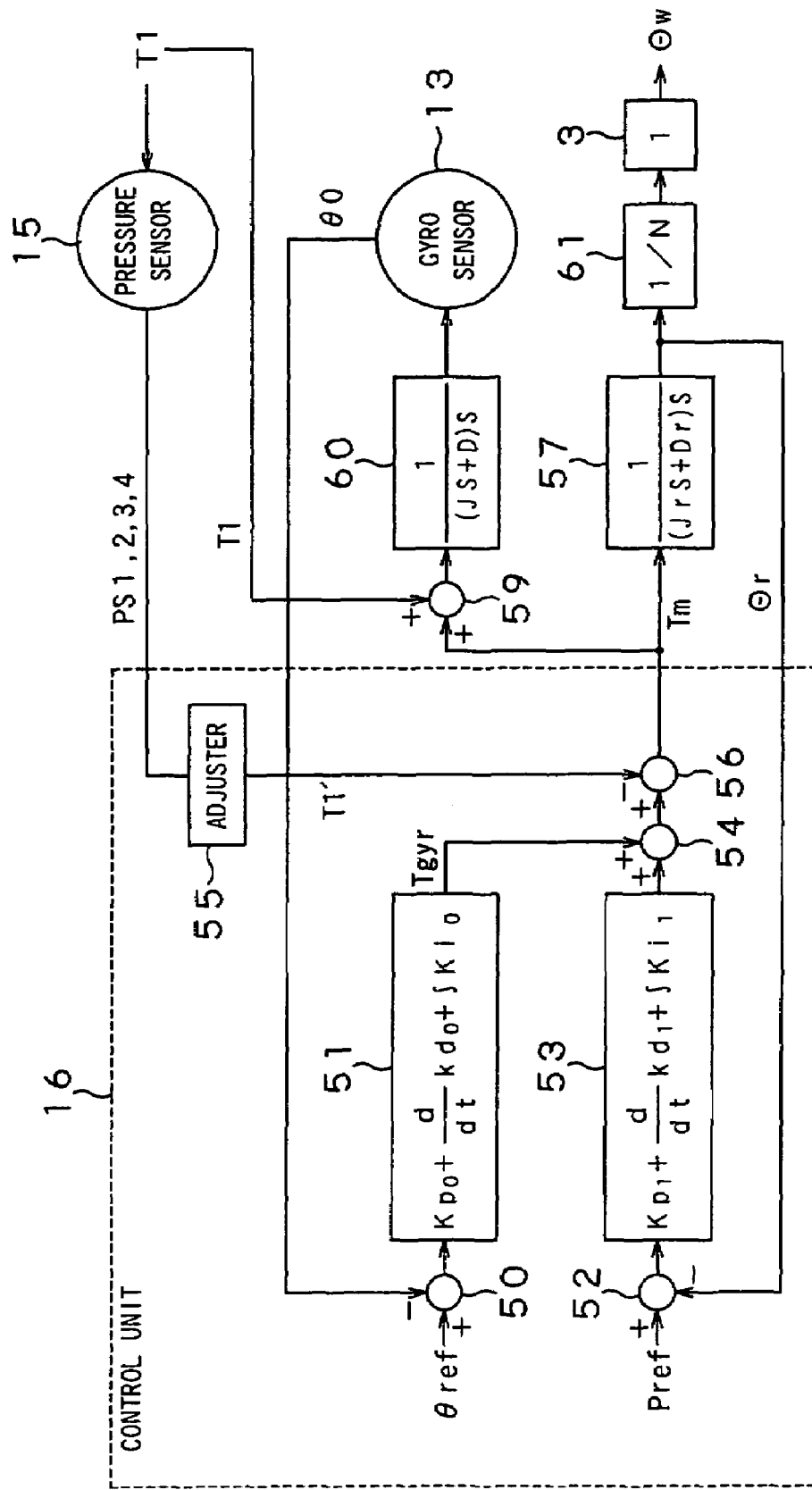
FIG. 15 is a view showing the block diagram shown in FIG. 14 as mathematical model.

FIG. 15 represents the processing in the block diagram shown in FIG. 14 as mathematical model by using Laplace operator. As described above, deviation between base angle command θref and current base angle $θ_0$ is delivered to the attitude controller 51, and deviation between rotational position command Pref of the motor rotor 57 and current rotational position θr is delivered to the motor controller 53. At the attitude controller 51 and the motor controller 53, respective motor torques are calculated by feedback control which performs, e.g., PID (Proportional-plus-Integral-plus Derivative (Differential)) operation. Namely, $Kp_0$, $Kp_1$ become proportional gain, $Ki_0$, $Ki_1$ become integral gain and $Kd_0$, $Kd_1$ become derivative (differential) gain. By these control gains, following characteristic in which the motor responds to attitude command θref and traveling command Pref is changed. For example, when proportional gains $Kp_0$, $Kp_1$ are reduced, the motor rotor 57 would move with slow following delay. When proportional gains $Kp_0$, $Kp_1$ are increased, the motor rotor 57 would follow at high velocity. By changing the control gain in this way, it becomes possible to adjust attitude command θref, traveling command Pref, and magnitude of error of actual movement and/or response time.

Further, motor torque Tm in which estimated load torque $T_1'$ is subtracted from added value of motor torque from attitude controller 51 and motor torque from the motor controller 53 is delivered to the motor rotor 57 so that the motor rotor 57 rotates by rotation angle θr. Here, Jr is inertia of the motor rotor 57, and Dr is viscosity resistance (damper factor) of the motor rotor 57.

On the other hand, while added value of reactive force of the motor torque Tm and load torque $T_1$ is applied to the motor/base 60 in a manner as described above, those torques are mutually canceled so that inclinating operation is suppressed. Here, J is inertia of the motor stator/base 60, and D is viscosity resistance (damper factor) of the motor stator/base 60.

Figure 16:
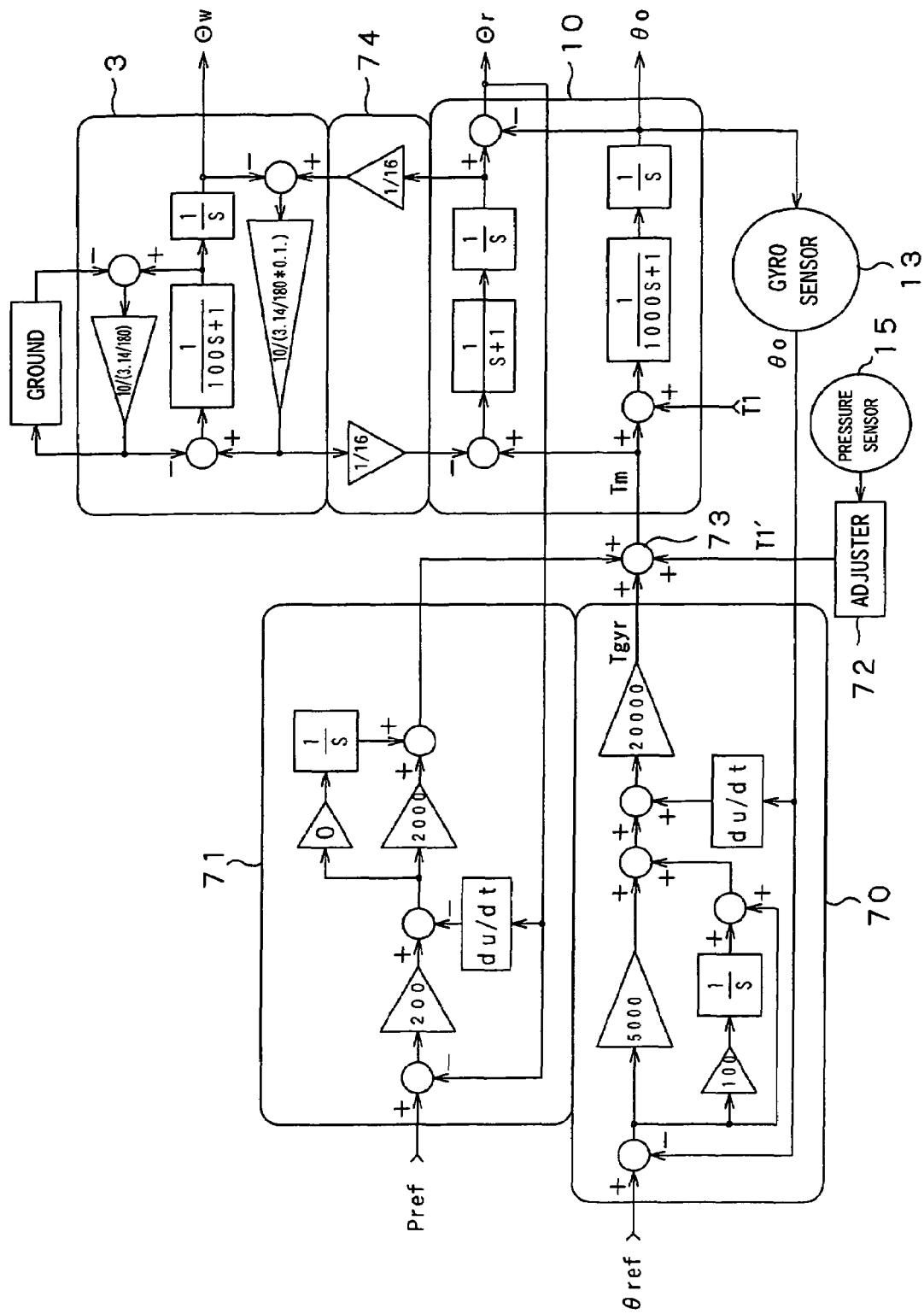
FIG. 16 is a view showing a detailed practical example of the mathematical model shown in FIG. 15.

The mathematical model shown in FIG. 15 is as shown in FIG. 16, for example, in more detail. As shown in FIG. 16, an attitude controller 70 serves to perform PID control with respect to deviation between base angle command θref and current base angle $θ_0$ to thereby generate motor torque Tgyr for attitude control. A motor controller 71 serves to perform PID control with respect to deviation between rotation position command Pref and current rotation position θr of the motor 10 to thereby generate motor torque for traveling control. Moreover, an adjuster 72 serves to generate estimated load torque $T_1'$ from sensor signals of the pressure sensors 15. At an adder 73, these respective torques are added. The motor torque Tm thus obtained is delivered to the motor 10. The motor 10 is rotationally driven by the motor torque Tm. Thus, its rotation is converted into 1/16 by a decelerator 74 having deceleration ratio of 16:1. The rotation thus converted is transmitted to the wheel 3.

While explanation has been given above in FIGS. 12 to 16 on the premise that single wheel 3 is provided for the brevity, e.g., attitude controller 51 in FIG. 14 is commonly used at left and right wheels 3R, 3L, whereas motor controllers 53 are independently provided at left and right wheels in actual coaxial two-wheeled vehicle 1 having two left and right two wheels 3R, 3L.

Figure 17:
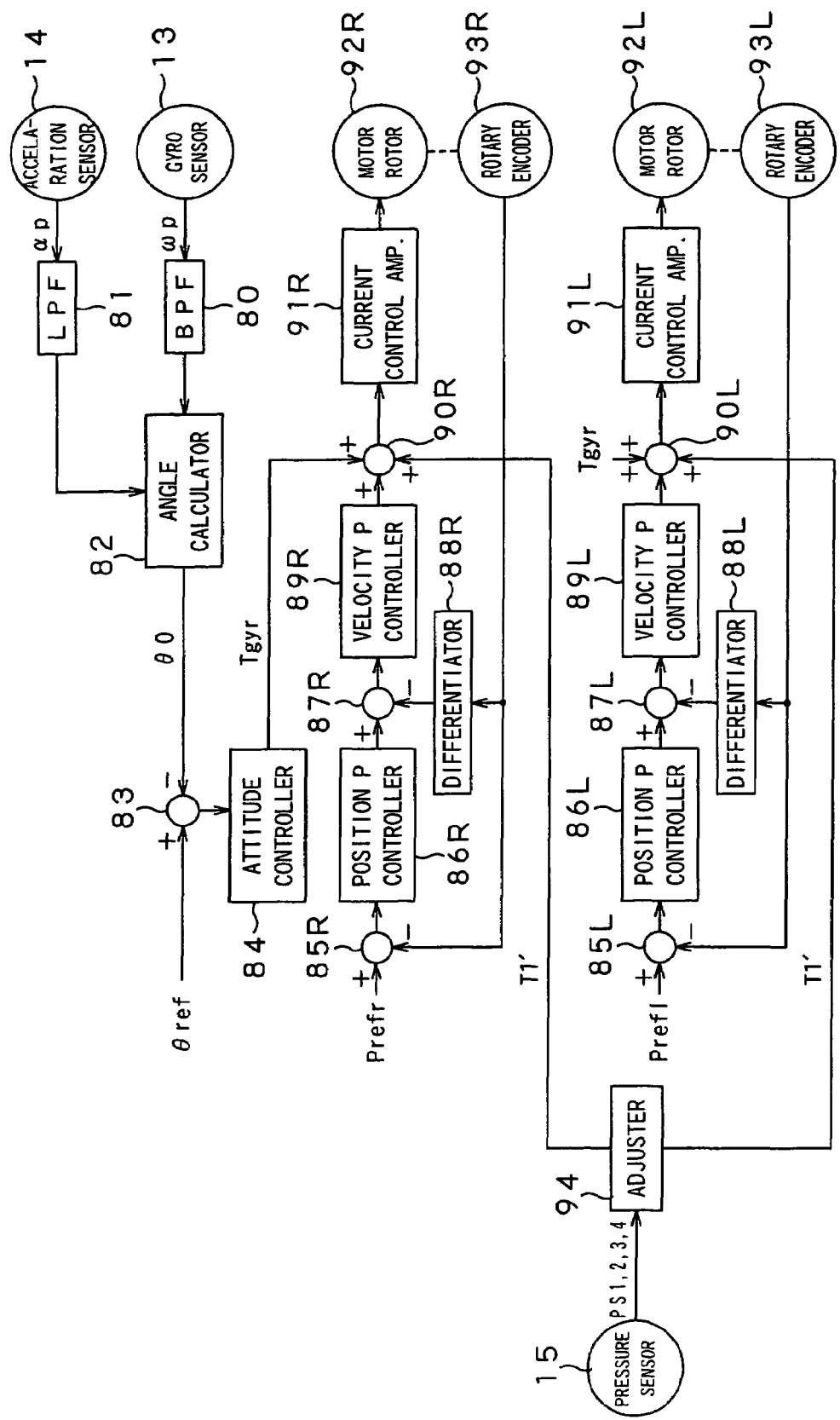
FIG. 17 is a block diagram showing control mechanism for attitude stabilization control and traveling control in the case where two wheels are provided.

The block diagram of the control mechanism in this case is shown in FIG. 17. A sensor value ωp from the gyro sensor 13 is sent to an angle calculator 82 through a Band-Pass Filter (BPF) 80 having passband of, e.g., 0.1 to 50 Hz, and a sensor value αp from the acceleration sensor 14 is sent to an angle calculator 82 through a Low-Pass Filter (LPF) 81 having cut-off frequency of, e.g., 0.1 Hz. At the angle calculator 82, current base angle $θ_0$ is calculated on the basis of these sensor values. Further, at a subtracter 83, deviation between base angle command θref serving as attitude command and current base angle $θ_0$ is taken. The deviation thus obtained is delivered to an attitude controller 84. The attitude controller 84 calculates the above-described motor torque Tgyr from the base angle command θref and current base angle $θ_0$.

On the other hand, at a subtracter 85R, deviation between rotational position command Rrefr of a motor rotor 92R serving as traveling command for right wheel 3R and current rotational position θr of a motor rotor 92R detected by a rotary encoder 93R is taken. The deviation thus obtained is delivered to a position proportional controller 86R. The position proportional controller 86R performs positional proportion (P) control with respect to the deviation to deliver the proportion control result to a subtracter 87R. Further, a differentiator 88R differentiates rotational position θr of the motor rotor 92R delivered from the rotary encoder 93R to deliver differentiated result to the subtracter 87R. Further, at the subtracter 87R, deviation between proportional control result from the position proportional controller 86R and differentiated result from the differentiator 88R is taken. The deviation thus obtained is delivered to a velocity proportional controller 89R. The velocity proportional controller 89R performs velocity proportion (P) control with respect to the deviation to deliver the proportional control result to the adder 90. At the adder 90R, the proportional control result, motor torque Tgyr, and estimated load torque $T_1'$ determined from sensor signals $PS_1$, $PS_2$, $PS_3$, $PS_4$ of the pressure sensors 15 at an adjuster 94 are added. The added value thus obtained is delivered to a current control amplifier 91R. The current control amplifier 91R serves to generate motor current on the basis of the added value to drive the motor rotor 92R. Rotational position of the motor rotor 92R is delivered to the differentiator 88R along with the subtracter 85R. Since this is similar also with respect to the left wheel 3L, explanation will be omitted.

As stated above, since the coaxial two-wheeled vehicle 1 in this embodiment has control mechanism for attitude stabilization control common to left and right wheels 3R, 3L and left and right independent control mechanism for traveling control, and these control mechanisms perform independent control operations, it becomes possible to stably and compatibly perform the attitude stabilization control and the traveling control.

Then, the velocity control of the coaxial two-wheeled vehicle 1 in this embodiment will be explained.

As described above, in the coaxial two-wheeled vehicle 1 in this embodiment, gravity center coordinate $(X_g, Y_g)$ of load and its load weight $W_g$ on the base 4 are detected from sensor signals $PS_1$, $PS_2$, $PS_3$, $PS_4$ of four pressure sensors $15_1$ to $15_4$ provided at four corners of the base 4 to determine load torque $T_1$. In this case, the gravity center coordinate $(X_g, Y_g)$ is used as control command for traveling direction and velocity.

Figure 18:
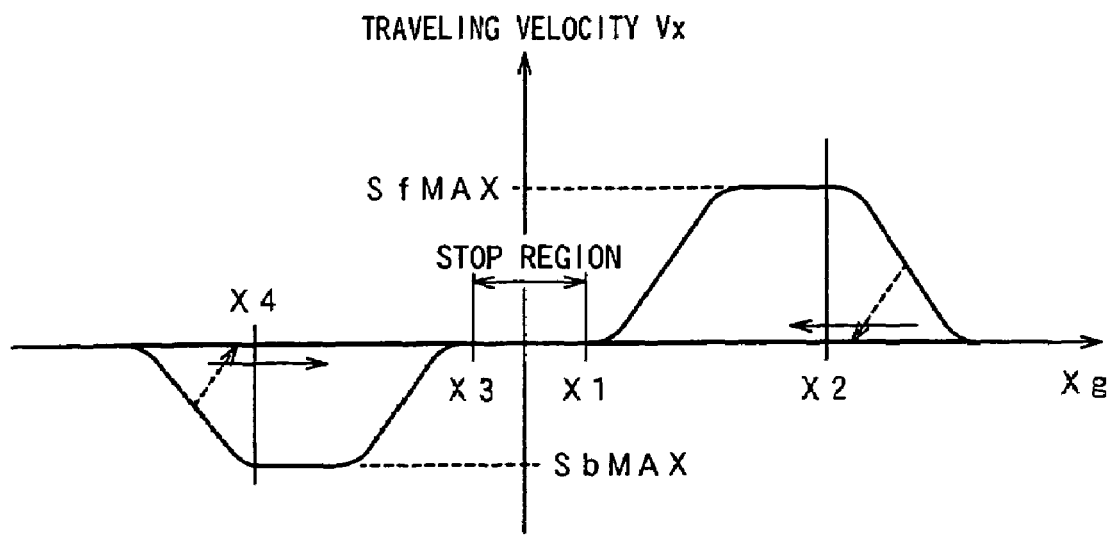
FIG. 18 is a view for explaining traveling velocity control in the case where forwarding/reversing operation is performed.

In concrete terms, in the case where load weight $W_g$ is a predetermined value or more, velocity command Vx is changed as shown in FIG. 18, for example, on the basis of X coordinate $X_g$ of gravity center position. Here, in FIG. 18, the range from $X_3$ to $X_1$ is stop region, and the command traveling velocity is caused to be zero within this range. It is preferable that the stop region is caused to be X-coordinate range of ground-contacting surface with respect to the road surface of the wheel 3. In this case, when, e.g., load weight $W_g$ is large, or gas pressure of the wheel 3 is low, since ground-contacting surface with respect to the road surface of the wheel 3 becomes large, the range of the stop region also becomes large. By providing the stop region (dead band) in this way, it can be prevented that the vehicle body advances or reverses (withdraws) by slight gravity center movement that the rider does not intend.

When X-coordinate is $X_1$ or more, command velocity is increased in accordance with magnitude of the X-coordinate until vehicle velocity reaches the advancing maximum velocity S fMAX. Moreover, when the X-coordinate becomes equal to $X_2$ or more, deceleration/stop operation is compulsorily performed. Thus, the vehicle body moves until the attitude is stabilized within the stop region for a second time, and is then stopped. By providing the region where deceleration/stop operation is compulsorily performed, it is possible to maintain safety of rider when traveling operation is performed at the maximum velocity. Similarly, when the X-coordinate becomes equal to $X_3$ or less, command velocity is increased in accordance with the magnitude of the X-coordinate until vehicle velocity reaches reversal (withdrawal) maximum velocity S bMAX. It is to be noted that it is preferable that the reversing maximum velocity S bMAX is smaller than the advance maximum velocity S fMAX. In addition, when the X-coordinate becomes equal to $X_4$ or less, deceleration/stop operation is performed. The vehicle body moves until the attitude is stabilized within the stop region for a second time, and is then stopped.

Within the range where the X-axis coordinate is from $X_1$ to $X_2$, or from $X_3$ to $X_4$, the rotational position command Prefr of the monitor 10R and the rotional position command Prefl of the motor 10L are generated by the following formula (19), for example, in accordance with the X-coordinate $X_g$. Here, in the formula (19), $G_0$ is positive constant gain, and is permitted to be adjustable in accordance with, e.g., load weight $W_g$.

$$Prefr = Prefl = X_g * G_0 \tag{19}$$

It is to be noted that it is preferable to perform traveling operation that in the case where velocity command at time t=0 is $Vx_0$ and velocity command at time $t=t_1$ is $Vx_1$, acceleration is continuously changed so that mechanical resonant oscillation does not take place. In this case, when the time until time reaches $Vx_1$ is assumed to be $\Delta t$, traveling velocity command Vref(t) at time t ($0 \leq t \leq t_1$) can be calculated by the following formula (20), for example.

$$Vref(t) = (1/4)t^4 - (2/3)\Delta t * t^3 + (1/2)\Delta t^2 * t^2 + Vx_0 \tag{20}$$

At this time, rotational position command Pref(t) of the motor 10 results in value obtained by integrating traveling velocity command Vref(t) of the formula (20), and is given by the fifth-order function as indicated by the following formula (21). Here, in the formula (21), $Pref_0$ is rotational position command at time t=0.

$$Pref(t) = \int Vref(t) dt + Pref_0 \tag{21}$$
$$= (1/20)t^5 - (2/12)\Delta t * t^4 + (1/6)\Delta t^2 * t^3 + Pref_0$$

Figure 19:
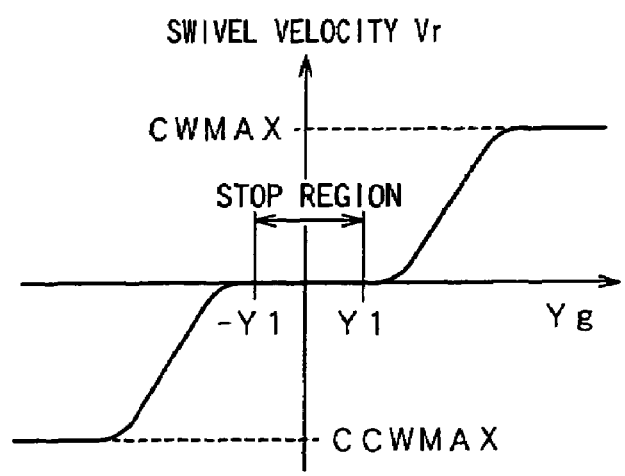
FIG. 19 is a view for explaining traveling velocity control in the case of performing swivel operation.
Figure 20:
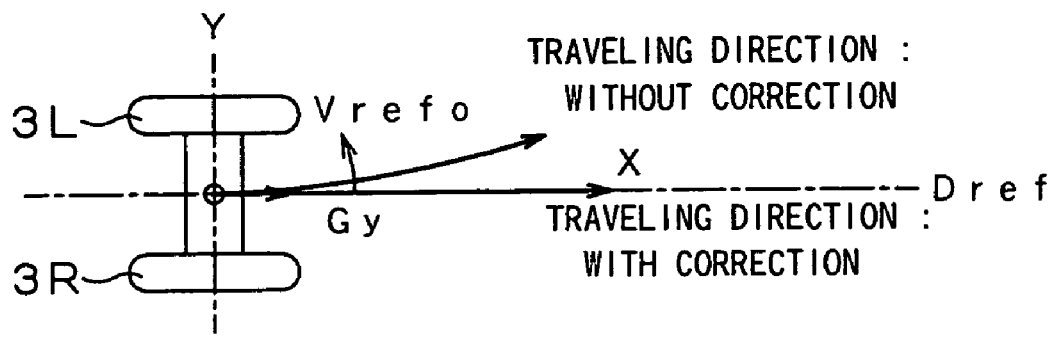
FIG. 20 is a view for explaining a control method in the case where gyro sensor signal about yaw axis is detected in performing straight forwarding operation.

Moreover, in the case where not only forwarding/reversing operation is performed, but also load weight $W_g$ is a predetermined value or more, it is also possible to vary swivel velocity command Vr as shown in FIG. 19, for example, on the basis of Y-coordinate $Y_g$ of gravity center position. Here, in FIG. 19, the range from $-Y_1$ to $Y_1$ is stop region, and command swivel velocity is caused to be zero within this range. It is to be noted that the stop region can be arbitrarily set in the vicinity of the origin O. By providing stop region (dead zone) in this way, it can be prevented that the vehicle body swivels by slight gravity center movement that the rider does not intend. When the Y-coordinate is $Y_1$ or more, until vehicle velocity reaches clockwise maximum velocity C WMAX, command swivel velocity is increased in accordance with the magnitude of the Y-coordinate. Similarly, when the Y-coordinate reaches $-Y_1$ or less, until vehicle velocity reaches counterclockwise maximum velocity CC WMAX, command swivel velocity is increased in accordance with the magnitude of the Y-coordinate.

When the Y-coordinate is $Y_1$ or more, or is $-Y_1$ or less, rotation position command Rrefr of the motor 10R and the rotation position command Rrefl of the motor 10L are generated in accordance with the Y coordinate $Y_g$. In the case where traveling velocity is zero, rotational position command Rrefr of the motor 10R and rotational position command R refl of the motor 10L result in anti-phase command as indicated by the following formula (22), for example. Here, in the formula (22), $G_1$ is positive constant gain, and is permitted to be adjustable in accordance with load weight $W_g$, for example.

$$Rrefr = -Rrefl = Y_g * G_1 \tag{22}$$

On the other hand, in the case where traveling velocity is not zero, rotational position command Rrefr of the motor 10R and rotational position command Rref l of the motor 10L result in in-phase command as indicated by the following formulas (23), (24), for example. Here, in the formulas (23), (24), $G_2$ is positive constant gain, and is permitted to be adjustable in accordance with load weight $W_g$, for example.

$$Rrefr = Prefr + Y_g * G_2 \tag{23}$$

$$Rrefl = Prefl - Y_g * G_2 \tag{24}$$

Here, in the case where the vehicle body travels on a road surface having uneven portions such as irregular road surface, etc., or inclined road surface, the vehicle body becomes difficult to travel in a target direction given by rotational position command for the left and right motors 10R, 10L so that there is the possibility that deviation may take place between target direction and actual traveling direction. Moreover, also in the case where effective diameter of the wheel 3 may vary by difference between gas pressures of left and right wheels 3R, 3L, there is the possibility that deviation may similarly take place between target direction and actual traveling direction. In view of the above, in the coaxial two-wheeled vehicle 1 in this embodiment, actual traveling direction is detected by gyro sensor 13 which detects angular velocity ωyaw about the yaw axis to independently control rotation velocities of left and right motors 10R, 10L to thereby eliminate deviation between the target direction and the actual traveling direction.

As an example, explanation will be given in connection with the case where effective diameter of the left wheel 3L is shorter than that of the right wheel 3R, and $\omega yaw_1$ [rad/sec] is detected as a gyro sensor signal about the yaw axis in performing straight forwarding operation. In such a case, when additive average of rotational velocity commands Vrefr, Vrefl is assumed as $Vref_0$, and rotational velocity commands Vrefr, Vrefl given to the left and right motors 10R, 10L are corrected as shown in the following formulas (25), (26), thereby permitting the vehicle body to perform straight forwarding operation. Here, in the formulas (25), (26), $K_0$ is positive constant.

$$Vrefr = Vref_0 - K_0 * \omega_{yaw1} \quad (25)$$

$$Vrefl = Vref_0 + K_0 * \omega_{yaw1} \quad (26)$$

Moreover, in the case where Dref [rad/sec] is given as target direction, rotational velocity commands Vrefr, Vrefl are applied to left and right wheels as shown in the following formulas (27), (28).

$$Vrefr = Vref_0 - K_0(Dref - \omega_{yaw1}) \quad (27)$$

$$Vrefl = Vref_0 + K_0(Dref - \omega_{yaw1}) \quad (28)$$

The rotation velocity commands Vrefr, Vrefl obtained in this way are converted into rotation position commands Prefr, Prefl of the wheels respectively by the following formulas (29), (30). Here, in the above formulas (29), (30), k is integer indicating the number of sampling operations, and Pref (k) indicates rotation position command at k-th sampling.

$$Rrefr(k) = Prefr(k) + Vref_0 \quad (29)$$

$$Rrefl(k) = Prefl(k) + Vref_0 \quad (30)$$

Similarly, also in the case where the vehicle body swivels, there is the possibility that deviation may take place at swivel velocity resulting from difference between gas pressures of left and right wheels 3R, 3L, and/or difference of the road surface situation, etc. Also in this case, actual swivel velocity is detected by gyro sensor 13 which detects angular velocity ωyaw about the yaw axis to independently control rotation velocities of the left and right motors 10R, 10L, thereby making it possible to eliminate deviation between target swivel velocity and actual swivel velocity.

As an example, explanation will be given in connection with the case where effective diameter of the left wheel 3L is shorter than that of the right wheel 3R, and $\omega yaw_2$ [rad/sec] is detected as a gyro sensor signal about the yaw axis in performing swivel operation. When signals obtained by differentiating rotation position command Rrefr of the right wheel 3R and rotation position command Rrefl of the left wheel 3L are respectively Vrefr, Vrefl, error ωerr of the swivel velocity is represented by the following formula (31).

$$\omega_{err} = (Vrefl - Vrefr) - \omega_{yaw2} \quad (31)$$

In this case, rotation position commands Rrefr, Rrefl given to left and right motors 10R, 10L are corrected as shown in the following formulas (32), (33), thereby making it possible to swivel the vehicle body in a manner suited to the target. Here, in the formulas (32), (33), $G_3$ is positive constant gain, and is permitted to be adjustable in accordance with, e.g., load weight $W_g$.

$$Rrefr = Prefr + Y_g * G_2 - \omega_{err} * G_3 \quad (32)$$

$$Rrefl = Prefl - Y_g * G_2 + \omega_{err} * G_3 \quad (33)$$

As stated above, in the coaxial two-wheeled vehicle 1 in this embodiment, actual traveling direction and actual swivel velocity are detected by gyro sensor 13 which detects angular velocity ωyaw about the yaw axis to independently control rotational velocities of left and right motors 10R, 10L, thereby making it possible to eliminate deviation between target direction (swivel velocity) and traveling direction (swivel velocity).

Moreover, in the case where the vehicle body travels on a road surface having offset, there is the possibility that impact force may be exerted on the vehicle body when the wheels 3 ride over the offset, or descend down the offset so that rider falls down. In view of the above, in the coaxial two-wheeled vehicle 1 in this embodiment, acceleration sensor 14 which detects linear acceleration Az in the Z-axis direction is utilized to reduce command traveling velocity in the case where acceleration change in the Z-axis direction has taken place to thereby relax impact force to the vehicle body.

Figure 21A:
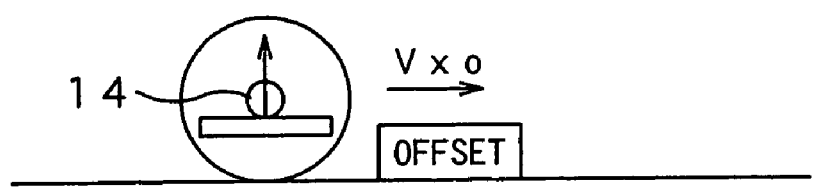
Figure 21B:
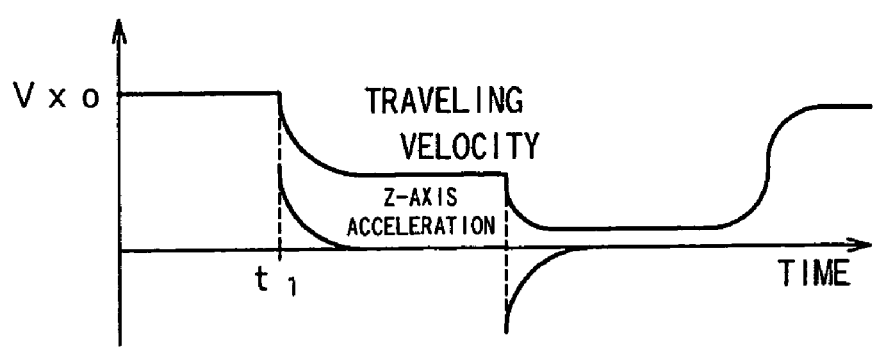

As an example, explanation will be given in connection with the case where the vehicle body travels on a road surface having offset as shown in FIG. 21A. When the vehicle body rides on the offset at time $t_1$ while it travels at traveling velocity $Vx_0$ as shown in FIG. 21B, acceleration Az in the Z-axis direction takes place. When absolute value |Az| of the acceleration Az becomes equal to threshold value $A_0$ or more, the vehicle body begins to decelerate. Namely, when integer indicating the number of times of sampling operations is assumed to be k, and traveling velocity at the k-th sampling is assumed to be Vx(k), until traveling velocity reaches the minimum value which has been set on the basis of absolute value |Vx(k)| of traveling velocity Vx(k), the vehicle body is decelerated in accordance with the following formula (34), for example. Here, in the formula (34), $ka_0$ is positive constant.

$$v_x(k) = v_x(k-1) - K_{\alpha 0} * |A_z| \quad (34)$$

Moreover, when absolute value |Az| of acceleration Az is below the threshold value $A_0$ after deceleration, until traveling velocity reaches the maximum value which has been set on the basis of absolute value |Vx(k)| of traveling velocity Vx(k), the vehicle body accelerates in accordance with the following formula (35), for example. Here, in the formula (35), $ka_1$ is positive constant.

$$v_x(k) = v_x(k-1) + K_{\alpha 1} \quad (35)$$

As stated above, in the coaxial two-wheeled vehicle 1 in this embodiment, in the case where acceleration sensor 14 which detects linear acceleration Az in the Z-axis direction is utilized so that acceleration change in the Z-axis direction takes place, e.g., in the case where the vehicle body rides on an offset, traveling velocity Vx is reduced to thereby have ability to relax impact force to the vehicle body. It is to be noted that gyro sensor 13 may be used in place of the acceleration sensor 14.

While the coaxial two-wheeled vehicle 1 can travel while performing attitude stabilization control as stated above, image recognition means and sound (speech) recognition means which will be explained in a manner as described below are provided to thereby have ability to realize high level function.

For example, ordinarily, the rider determines traveling direction by visual sense. However, since when traveling velocity is increased, eye of the rider is directed farther, there is the possibility that there takes place the problem that the road surface below the foot cannot be seen so that he falls down by uneven portion or offset of the road surface. Moreover, also in the case where the coaxial two-wheeled vehicle 1 is caused to independently travel, when uneven portions of the road surface and/or obstacle on the road source cannot be detected, there is the possibility that there may take place the problem that the vehicle body collides with obstacle, and/or the problem that the vehicle body becomes unstable so that it falls down.

Figure 22A:
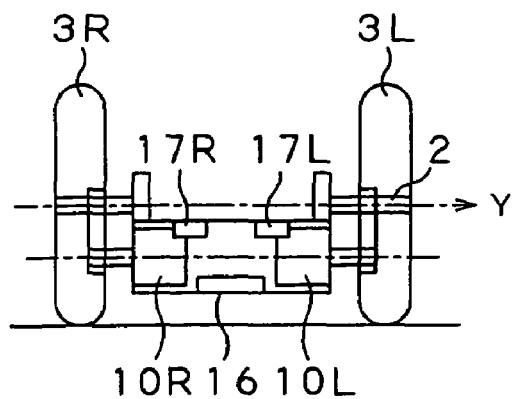
Figure 22B:
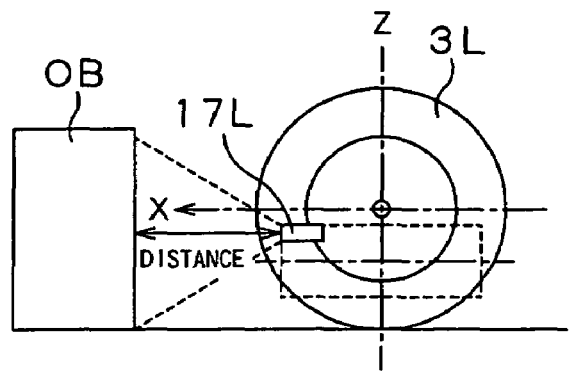

In view of the above, in the coaxial two-wheeled vehicle 1 in this embodiment, as shown in FIG. 22A, two CCD cameras 17 (17R and 17L) are mounted on the base 4 close to the road surface. Accordingly, by using these CCD cameras 17R, 17L, as shown in FIG. 22B, it is possible to detect road surface environment close thereto by tigonometrical survey method from difference between left and right images, e.g., obstacle OB or magnitude and position and/or uneven portion of the road surface of obstacle OB. Thus, it becomes possible to avoid the road surface environment where the vehicle body cannot travel, or to avoid obstacle of the road surface in non-contact manner.

Moreover, it is also possible to specify object designated by image recognition, e.g., moving object like human being to perform traveling operation of the vehicle body in a manner followed thereby.

Figure 23A:
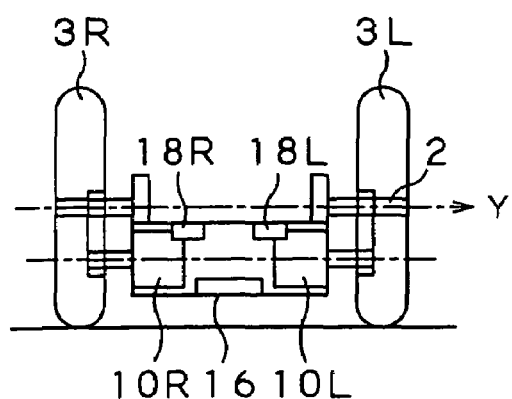
Figure 23B:
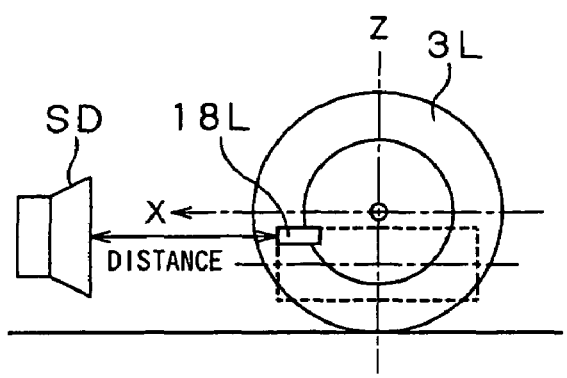

Further, in the coaxial two-wheeled vehicle 1 in this embodiment, as shown in FIG. 23A, two microphones (18R and 18L) are mounted on the base 4 close to the road surface. By using these two microphones 18R, 18L, it is possible to estimate direction and distance of sound source SD as shown in FIG. 23B. Thus, e.g., it becomes possible to respond to sound source, or to rotate the wheels 3 so that the vehicle body is oriented toward sound source direction. Further, in the case where the vehicle body is near the sound source, it is possible to stop traveling operation to thereby have ability to prevent collision against sound source. Further, speaker recognition using audio signal is applied to register in advance voice of user to turn ON LED or to produce sound (voice) in the case where that sound (voice) is recognized so that vehicle body recognition in the case where it is stolen, and/or selection of vehicle body by voice of user when a large number of the same kind of vehicle bodies are arranged can be made.

It is to be noted that since noise at the time of rotation of the wheel 3, etc. is also inputted to the microphone 18 except for voice of the human being, there is the possibility that precise sound source estimation and/or speaker recognition may become difficult. In view of the above, in the coaxial two-wheeled vehicle 1 in this embodiment, in the case where speech (sound) recognition or speaker recognition is performed at the time of traveling operation, frequency component of a noise signal stored in the memory in advance is removed from an audio signal on which noise is superimposed to perform sound source estimation, etc. on the basis of the audio signal from which noise has been removed. Thus, also at the time of traveling operation, precise sound source estimation and/or speaker recognition, etc. can be performed.

Figure 24:
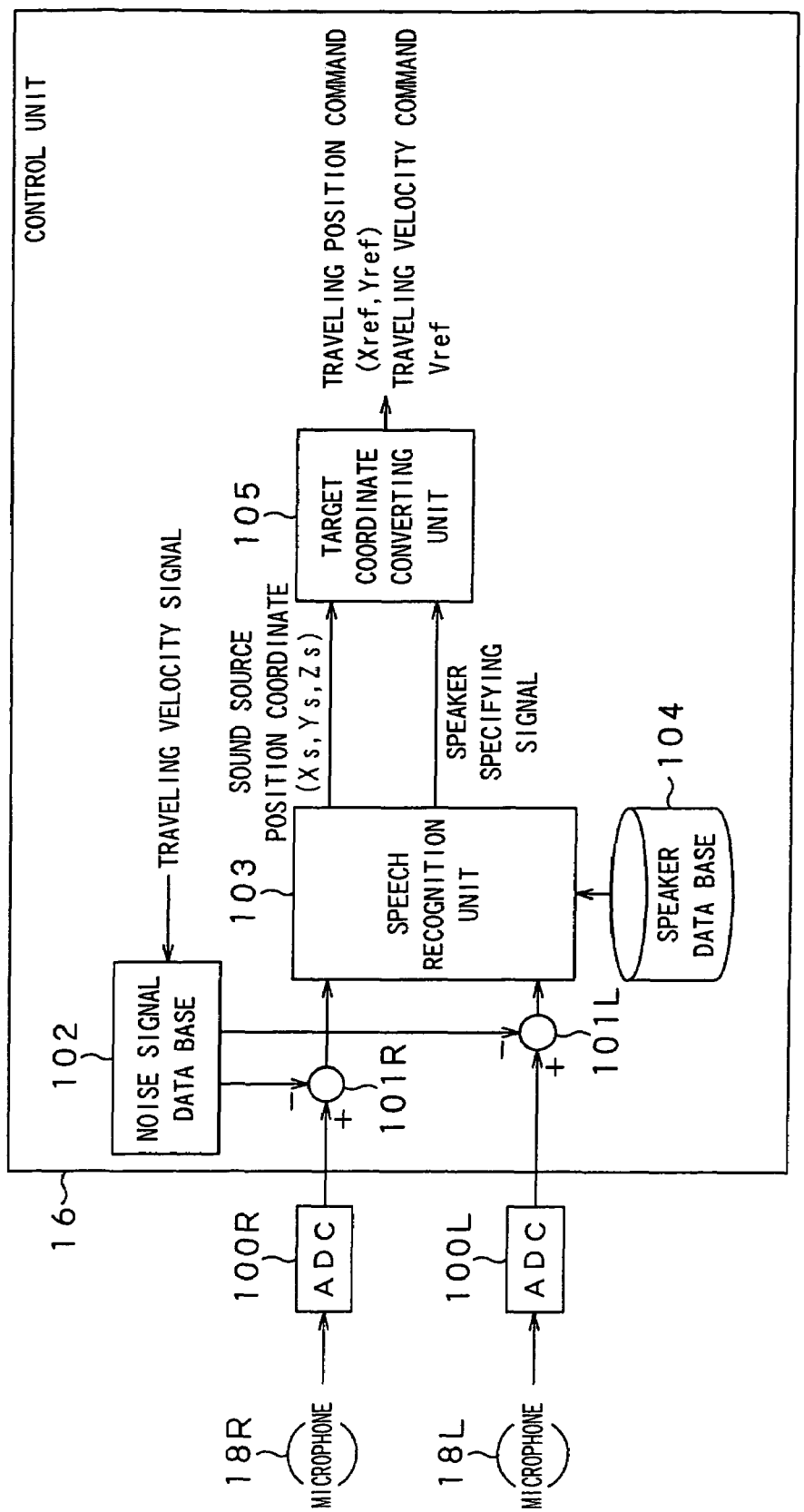
FIG. 24 is a block diagram showing control mechanism which realizes sound source detection during traveling operation, etc.

In concrete terms, as shown in FIG. 24, audio signals detected by left and right microphones 18R, 18L are converted into digital signals at analog/digital converters (ADC) 100R, 100L. The digital signals thus obtained are delivered to subtracters 101R, 101L. On the other hand, noise signals at various traveling velocities are stored in advance at a noise signal data base 102. When current traveling velocity signal is inputted to the noise signal data base 102, a noise signal corresponding to the traveling velocity is read out. The noise signal thus read out is delivered to subtracters 101R, 101L. At the subtracter 101R, 101L, frequency component of the noise signal is removed from audio signals delivered from analog/digital converters 100R, 100L.

The speech (sound) recognition unit 103 not only determines position coordinate (Xs, Ys, Zs) of sound source by using audio signal from which frequency component of noise signal has been removed, but also specifies speaker who has speaked by using speaker data base 104 to deliver sound source position coordinate (Xs, Ys, Zs) or speaker specifying signal to a target coordinate converting unit 105. The target coordinate converting unit 105 allows, e.g., sound source position (Xs, Ys) in the X-Y coordinate system to be target position (Xref, Yref) to output traveling position command (Xref, Yref) and traveling velocity command Vref.

Figure 25:
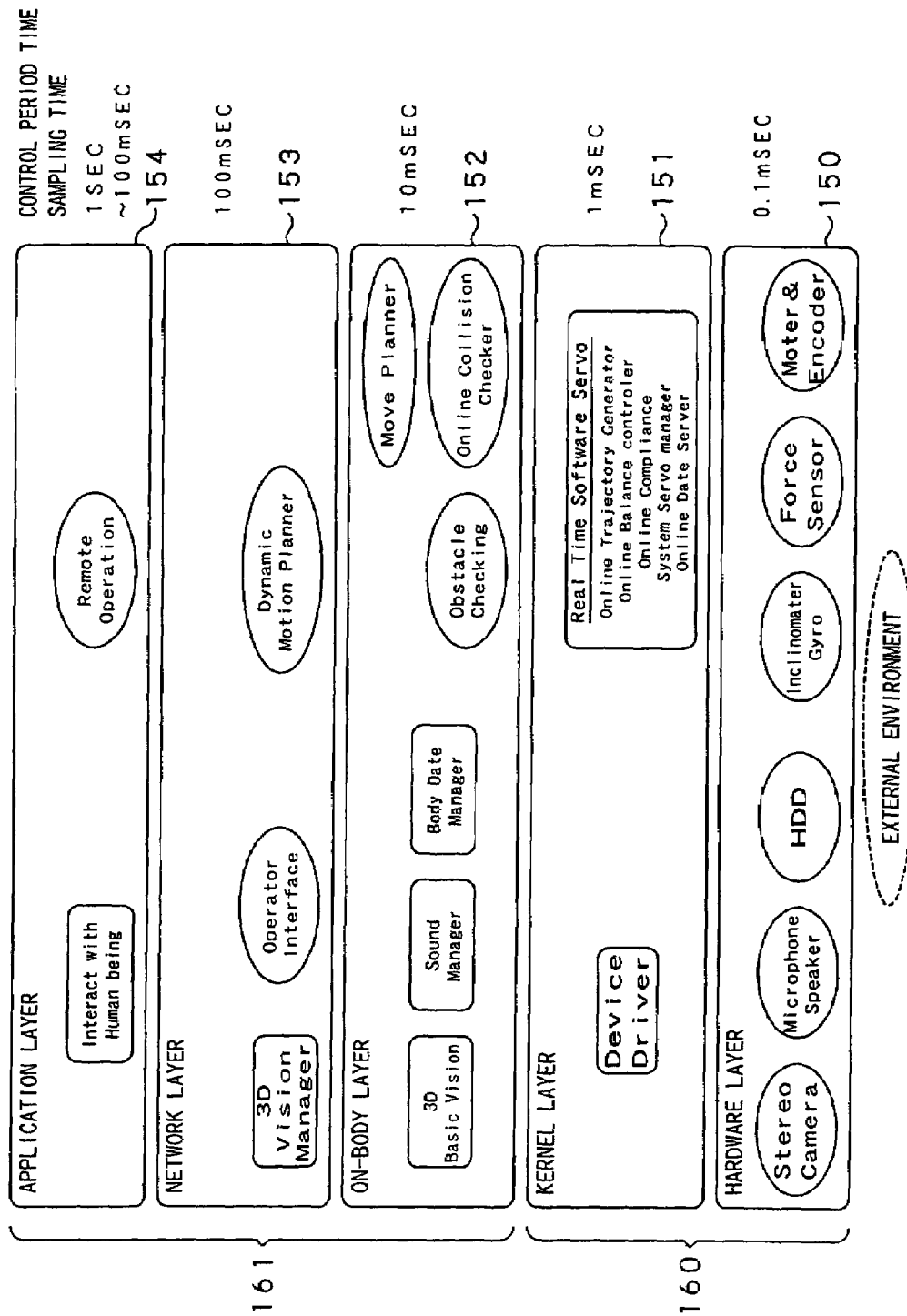
FIG. 25 is a view for explaining software configuration of the coaxial two-wheeled vehicle.

The software configuration of such coaxial two-wheeled vehicle 1 will be explained by using FIG. 25. As shown in FIG. 25, the software configuration is caused to be realized as hierarchical structure comprising, in order from hardware layer 150 of the lowest layer, kernel layer 151, on-body layer 152, network layer 153 and application layer 154 of the uppermost layer.

The hardware layer 150 is a layer of circuit, wherein, e.g., motor control circuit, central control circuit, and control circuit such as sensor circuit, etc. are included. The kernel layer 151 is a layer for performing various operations such as motor servo operation, attitude control operation, traveling control operation and/or real time traveling target value operation, etc. The layer 160 for the attitude traveling control is constituted by the hardware layer 150 and the kernel layer 151.

The On-body layer 152 is a layer for performing speech recognition, image recognition, traveling target value operation, and/or generation of obstacle avoidance orbit, etc. The obstacle avoidance, following toward object and/or traveling toward sound source, etc. which have been described in FIGS. 22A, 22B, FIGS. 23A, 23B are executed at this layer. Moreover, the network layer 153 located at the upper level includes network communication interface, network communication for traveling control information and/or image speech information, traveling plan management of the vehicle body, man-machine interface to and from rider, and/or three-dimensional image recognition data base management, etc. Further, the uppermost application layer 154 is a layer for performing remote traveling control by the network communication and/or dialog between rider and the vehicle body, etc. A hierarchy 161 for upper level control is constituted by the ON-body layer 152, the network layer 153 and the application layer 154.

These respective layers are executed at sampling control periods different from each other, and the period thereof becomes longer according as corresponding layer proceeds to the upper layer. For example, at the hardware layer 150 of the lowest layer, its control period is short period of 0.1 msec, whereas the control period is 1 msec at the kernel layer 151, the control period is 10 msec at the on-body layer 152, the control period is 100 msec at the network layer 153, and the control period is long period of 1 to 100 msec at the application layer 154.

Figure 26:
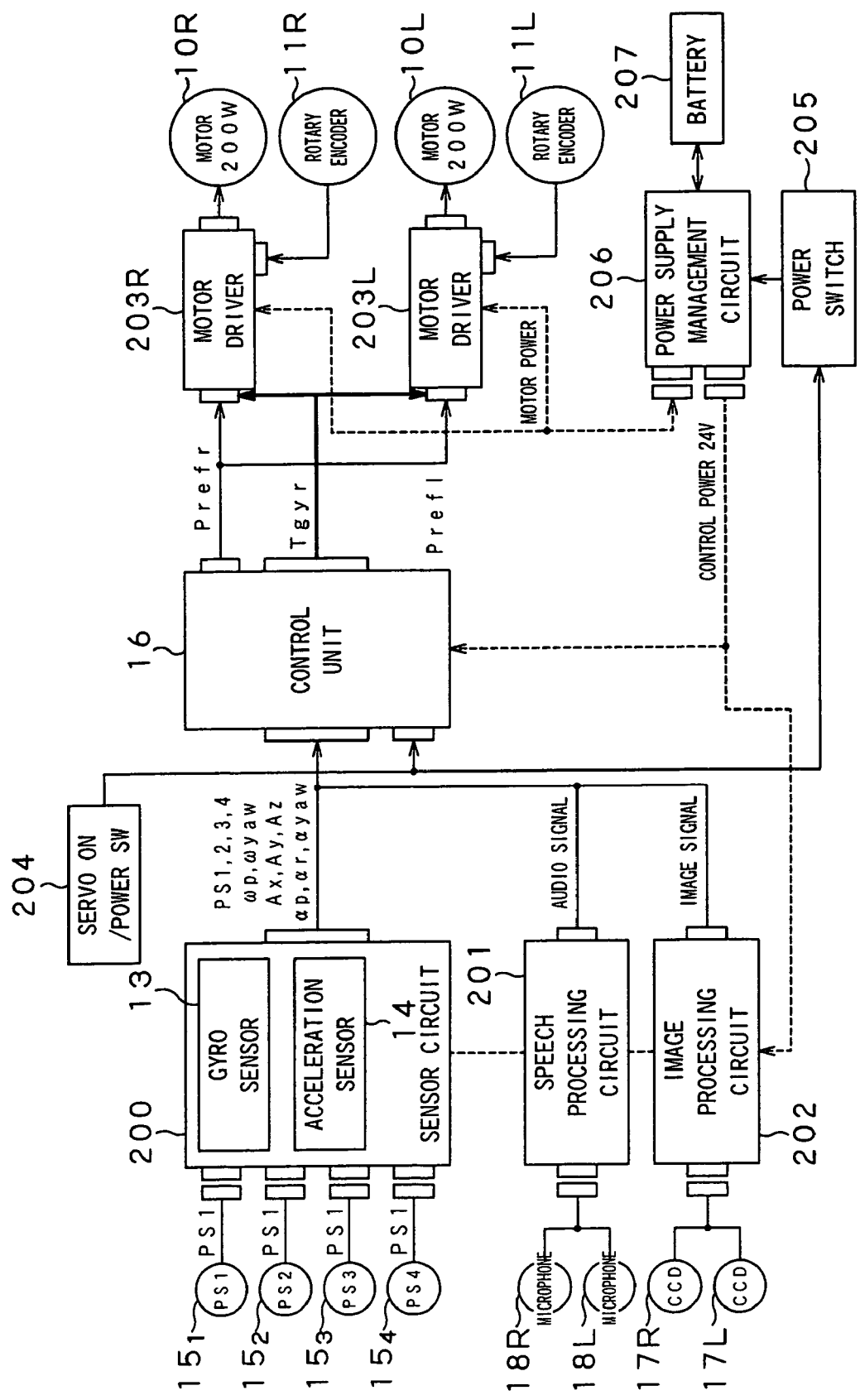
FIG. 26 is a view for explaining the entire configuration of respective circuits of the coaxial two-wheeled vehicle 1.

Subsequently, the entire configuration of the circuit in the coaxial two-wheeled vehicle will be explained. As shown in FIG. 26, sensor signals $PS_1$, $PS_2$, $PS_3$, $PS_4$ from the pressure sensors $15_1$ to $15_4$ are delivered. The sensor circuit 200 delivers, in combination, to the control unit 16, sensor signals ωp, ωyaw from the gyro sensors for detecting angular velocities about the pitch axis and the yaw axis and sensor signals Ax, Ay, Az, αp, αr, αyaw from acceleration sensors 14 for detecting linear acceleration in X, Y, Z axis directions, and angular velocities about the pitch axis, the roll axis and the yaw axis in addition to the above-mentioned sensor signals. Moreover, the speech processing circuit 201 is supplied with audio signals from the microphones 18R, 18L, and the image processing circuit 202 is supplied with image signals from the CCD cameras 17R, 17L. The speech processing circuit 201 and the image processing circuit 202 deliver the audio signal and image signal to the control unit 16.

The control unit 16 generates, on the basis of these sensor signals and the audio/image signals, motor torque Tgyr and rotational position command Pref of the motor rotor serving as traveling command in a manner as described above to deliver these values to left and right motor drivers 203R, 203L. The motor drivers 203R, 203L calculate, on the basis of the motor torque Tgyr and the rotation position command Pref, etc. of the motor rotor, optimum motor currents for driving, e.g., motors 10R, 10L of 200 W to deliver them to the motors 10R, 10L. Rotational positions of the motors 10R, 10L are determined by rotary encoders 11R, 11L, and are fed back to the motor drivers 203R, 203L.

A servo ON/power switch 204 is connected to the control unit 16 and the power switch 205, and a signal from the power switch 205 is delivered to a power management circuit 206. The power management circuit 206 is connected to a battery 207, and delivers control power of 24V to voice processing circuit 201 and image processing circuit 202, and delivers motor power to motor drivers 203R, 203L. Regenerative powers of motors 10R, 10L are delivered to the power supply management circuit 206 through motor drivers 203R, 203L, and the power supply management circuit 206 charges the battery 207 by using the regenerative power.

Figure 27A:
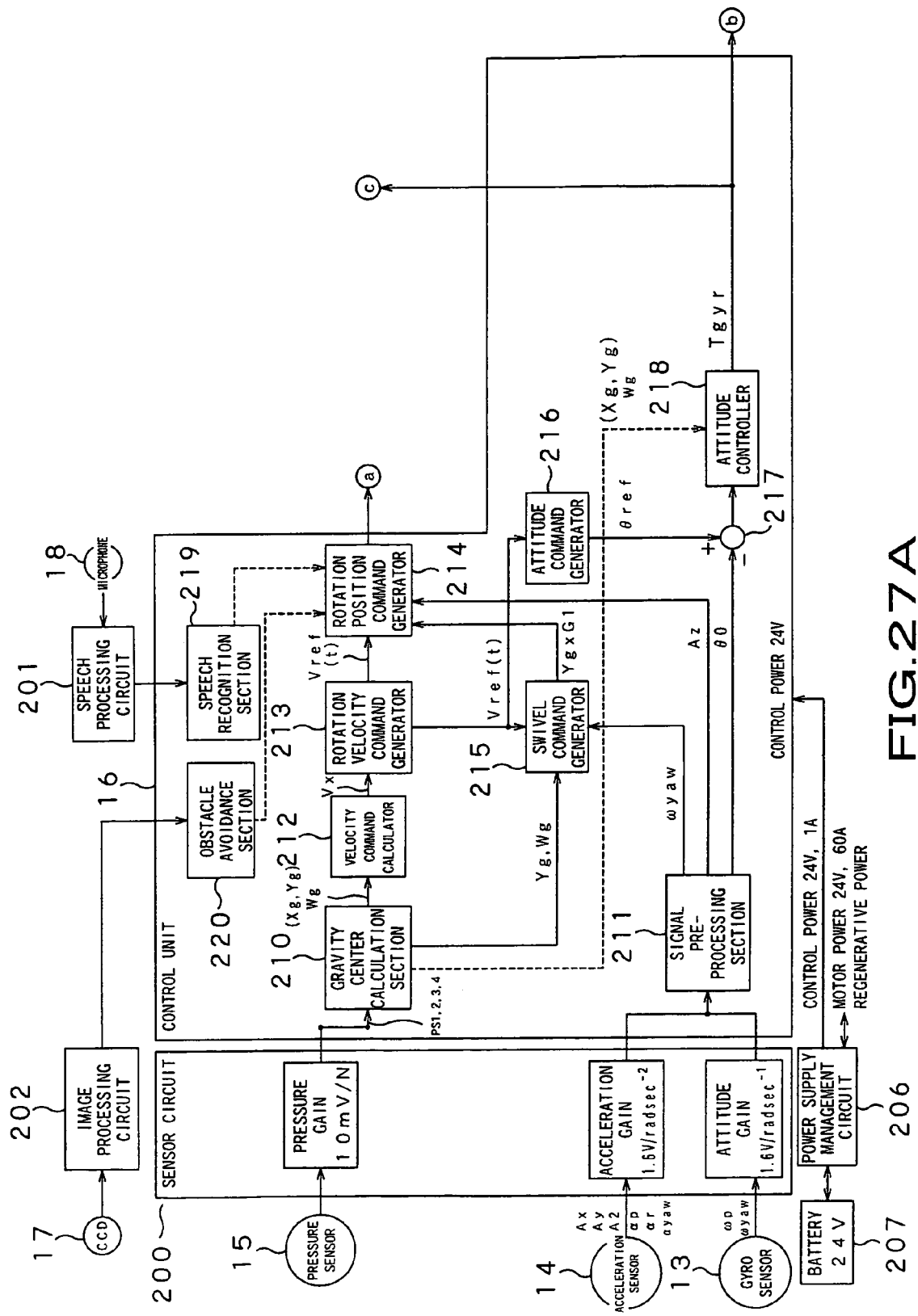
FIGS. 27A and 27B are views for explaining detailed internal configuration of the entire configuration shown in FIG. 26.
Figure 27B:
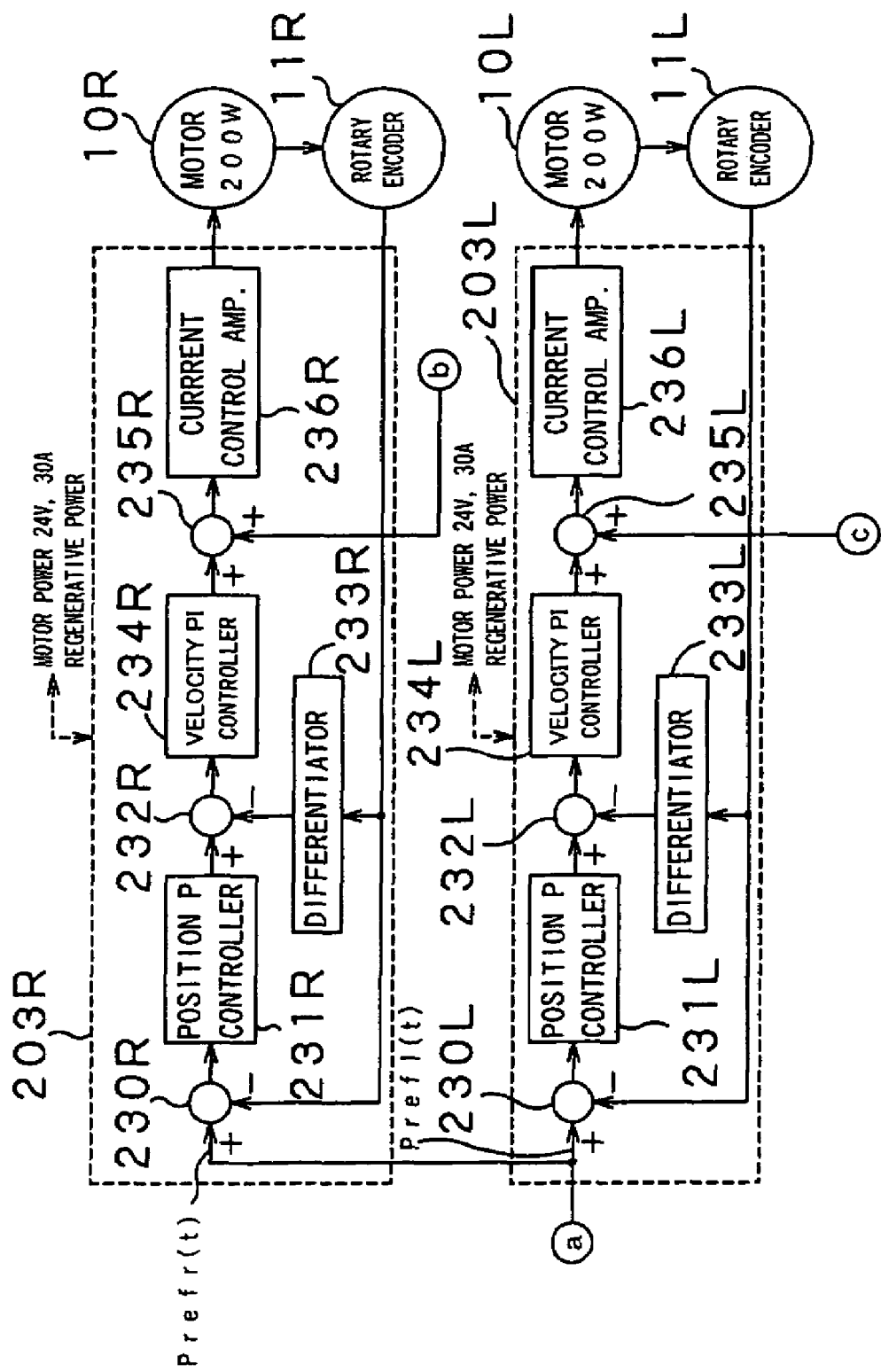

The detailed internal configuration of the entire configuration shown in FIG. 26 will be explained by using FIGS. 27A and 27B. As shown in FIGS. 27A and 27B, sensor signals $PS_1$, $PS_2$, $PS_3$, $PS_4$ from the pressure sensors 15, sensor signals ωp, ωyaw from the gyro sensor 13, and sensor signals Ax, Ay, Az, αp, αr, αyaw from the acceleration sensor 14 are delivered to the sensor circuit 200. The sensor circuit 200 performs gain adjustment of sensor signals $PS_1$, $PS_2$, $PS_3$, $PS_4$ from the pressure sensors 15 by, e.g., pressure gain of 10 mv/N to further convert those signals into digital signals through Analog-Digital converter (not shown) thereafter to deliver the signals thus converted to gravity center computational (operation) unit 210 of the control unit 16. Moreover, the sensor circuit 200 performs gain adjustment of sensor signals ωp, ωyaw from the gyro sensor 13 by attitude gain of, e.g., 1.6 V/rad sec$^{-1}$, and performs gain adjustment of sensor signals Ax, Ay, Az, αp, αr, αyaw from the acceleration sensor 14 by attitude gain of, e.g., 1.6 V/rad sec$^{-2}$ to further convert them into digital signals through analog-digital converter (not shown) thereafter to deliver the digital signals thus obtained to signal pre-processing unit 211. The signal preprocessing unit 211 performs pre-processing to implement digital filter to an inputted signal, or to calculate offset adjustment quantity or attitude position, i.e., base angle $\theta_0$.

The gravity center computing unit 210 calculates, on the basis of sensor signals $PS_1$, $PS_2$, $PS_3$, $PS_4$ from the pressure sensors 15, gravity center position coordinate (Xg, Yg) of load on the base 4 and its load weight Wg as previously described to deliver information of the gravity center position coordinate (Xg, Xy) and load weight Wg to traveling command calculator 212, and delivers information of Y-coordinate Yg of gravity center position and load weight Wg to swivel command generator 215. The traveling command calculator 212 generates velocity command Vx on the basis of gravity center position X-coordinate-traveling velocity characteristic as shown in FIG. 18, for example, and the rotational velocity command generator 213 performs the previously described fifth-order function operation on the basis of the velocity command Vx to thereby generate rotation velocity command Vref(t). The rotation velocity command generator 213 delivers rotational position command Pref(t) to the rotation position command generator 214, the swivel command generator 215, and the attitude command generator 216.

The swivel command generator 215 generates phase command in performing swivel operation, e.g., Yg*$G_1$ on the basis of Y-coordinate Yg and load weight Wg of the gravity center position delivered from the gravity computing unit 210, rotation angular velocity ωyaw about the yaw axis delivered from the signal pre-processing unit 211, and rotation velocity command Vref(t) delivered from the rotation velocity command generator 213 to deliver the phase command thus generated to a rotation position command generator 214. The rotation position command generator 214 integrates rotation velocity command Vref(t) delivered from the rotation velocity command generator 213 to generate rotation position command Pref(t) to deliver rotation position commands Prefr(t), Prefl(t) to left and right motor drivers. In this instance, the rotation position command generator 214 generates rotation position commands Prefr(t). Prefl(t) by taking phase command from the swivel command generator 215 in consideration.

Here, the sound (speech) processing circuit 201 delivers an audio signal from the microphone 18 to the sound (speech) recognition section 219 of the control unit 16. The sound (speech) recognition section 219 performs processing for estimating, e.g., sound source position coordinate and/or speaker on the basis of the audio signal to generate a traveling position command in which its sound source position is caused to be traveling target. Moreover, the image processing circuit 202 delivers an image signal from the CCD camera 17 to an obstacle avoidance section 220 of the control unit 16. The obstacle avoidance section 220 detects obstacle on the road surface on the basis of the image signal to generate a traveling position command for avoiding that obstacle. The above-described rotation position command generator 214 may also generate rotation position commands Prefr(t), Prefl(t) on the basis of the traveling position command from the sound (speech) recognition unit 219 or the obstacle avoidance unit 220.

Figure 13:
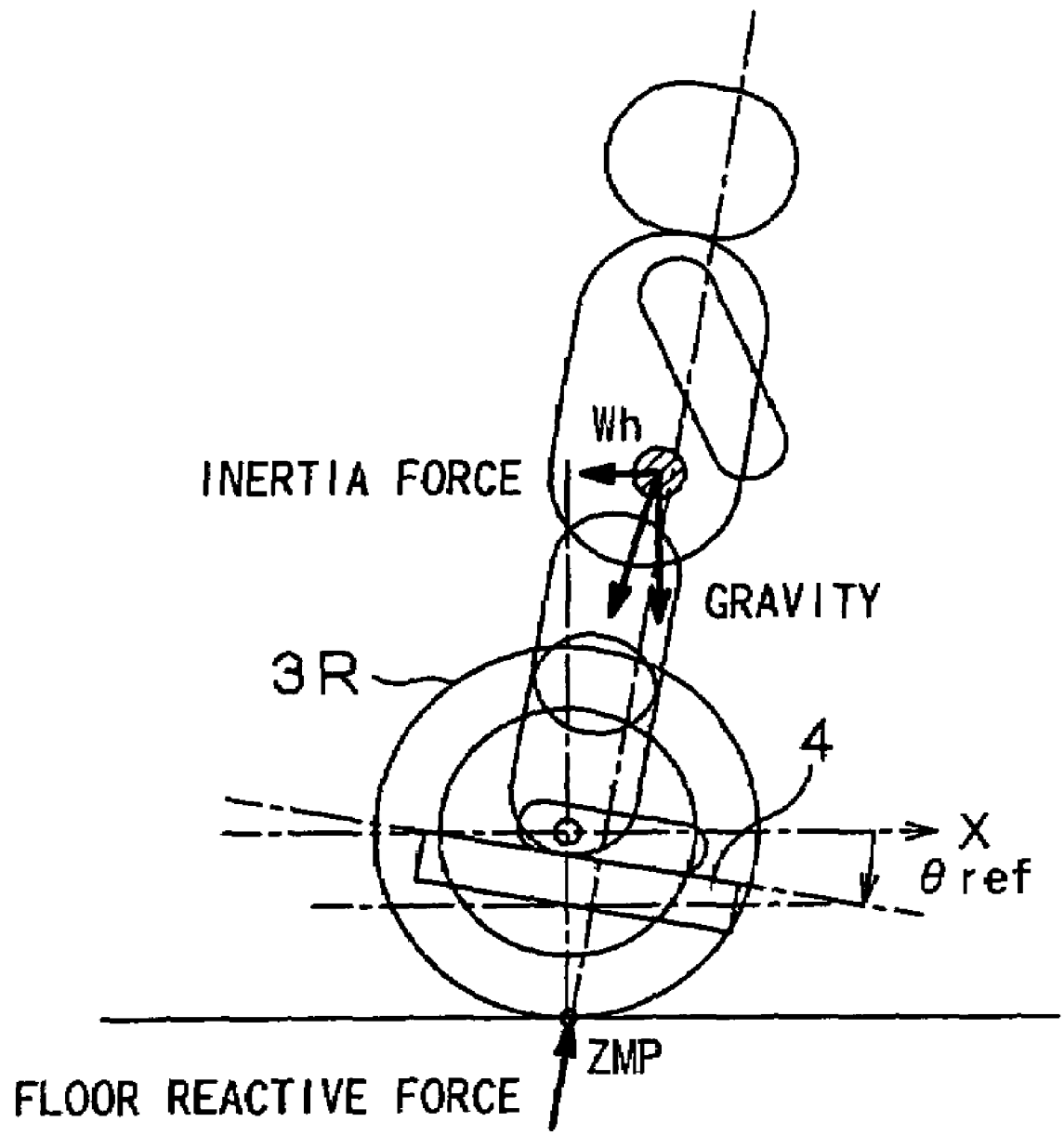
FIG. 13 is a view for explaining attitude command in the coaxial two-wheeled vehicle.

The attitude command generator 216 calculates base angle command θref serving as attitude command which has been explained by using FIG. 13 on the basis of the rotation velocity command Vref(t) which has been delivered from the rotation velocity command generator 213 to deliver the base angle command θref thus calculated to a subtracter 217. At the subtracter 217, current base angle $\theta_0$ which has been determined at the signal pre-processing unit 211 is subtracted from the base angle command θref. The deviation thereof is delivered to an attitude controller 218. The attitude controller 218 performs PID control on the basis of the deviation to determine motor torque Tgyr. It is to be noted that, in performing the PID control, PI gain may be changed in accordance with load weight Wg on the base 4. In concrete terms, it is preferable that when load weight Wg becomes large, proportional gain is increased and integral gain is reduced. The attitude control unit 218 delivers the motor torque Tgyr to left and right motor drivers 203R, 203L.

In the motor driver 203R for right wheel 3R, at a subtracter 230R, deviation between rotation position command Prefr serving as traveling command for motor 10R and current rotation position θr of the motor 10R which has been detected by the rotary encoder 11R is taken. The deviation thus obtained is delivered to a position proportional controller 231R. The position proportion controller 231R performs position proportional (P) control with respect to the deviation to deliver proportional control result to a subtracter 232R. Moreover, a differentiator 233R differentiates rotation position θr of the motor 10R which has been delivered from the rotary encoder 11R to deliver differentiated result to the subtracter 232R. Further, at the subtracter 232R, deviation between proportional control result from the positional proportional controller 231R and differentiated result from the differentiator 233R is taken. The deviation thus obtained is delivered to a velocity proportional·integralal controller 234R. The velocity proprtional·integral controller 234R performs velocity proportional·integral (PI) control with respect to the deviation thus obtained to deliver proportional·integral control result to an adder 235R. At the adder 235R, the proportional·integral control result and motor torque Tgyr are added. The added value thus obtained is delivered to a current control amplifier 236R. The current control amplifier 236R generates motor current on the basis of the added value to drive, e.g., motor 10R of 200 W. The rotational position of the motor 10R is delivered to the differentiator 233R along with the subtracter 230R. Since this similarly applied to the left wheel 3L, the explanation thereof will be omitted.

The power supply management circuit 206 is connected to, e.g., a battery 207 of 24V, and serves to deliver control power of 24V, 1 A to the control unit 16, and to respectively deliver motor powers to the motor drivers 203R, 203L. Regenerative powers of motors 10R, 10L are delivered through motor drivers 203R, 203L to the power supply management circuit 206. Thus, the power supply management circuit 206 charges the battery 207 by the regenerative powers.

As explained above, in the coaxial two-wheeled vehicle 1 in this embodiment, there are provided attitude controller common to left and right wheels 3R, 3L, which generates motor torque Tgyr for performing angular control of the base 4 by using the gyro-sensor 13 and the acceleration sensor 14 and motor torque $T_1'$ for canceling load torque by using the pressure sensors 15, and left and right independent motor controllers which generate motor torque for performing traveling control by using the pressure sensors 15 so that those controllers perform independent control operations. For this reason, it is possible to stably and compatibly perform attitude stabilization control and traveling control.

Moreover, in the coaxial two-wheeled vehicle 1 in this embodiment, traveling control is performed in accordance with gravity center coordinate of load on the base 4. In this case, since stop regions (dead zones) are provided within the X-coordinate range and the Y-coordinate range of the ground-contacting surface with respect to the road surface of the wheel 3, it can be prevented that the vehicle body advances, reverses (withdraws) and/or swivels by slight gravity center movement that the rider does not intend.

Further, in the coaxial two-wheeled vehicle 1 in this embodiment, actual traveling direction and actual swivel velocity are detected by gyro sensor 13 which detects angular velocity ωyaw about the yaw axis to independently control rotational velocities of left and right motors 10R, 10L, thereby making it possible to eliminate deviation between target direction (swivel velocity) and traveling direction (swivel velocity).

Furthermore, in the coaxial two-wheeled vehicle 1 in this embodiment, acceleration sensor 14 which detects linear acceleration Az in the Z-axis direction is utilized, whereby in the case where acceleration change in the Z-axis direction takes place, e.g., the vehicle body rides on offset, traveling velocity Vx is reduced, thereby making it possible to relax impact force with respect to the vehicle body.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

For example, while explanation has been given in the above-described embodiments on the premise that swivel velocity command Vr is changed on the basis of Y-coordinate $Y_g$ of gravity center position on the base 4, the present invention is not limited to such implementation, but the handle 5 may be caused to have steering characteristic. In this case, potentiometer may be included at the base 4 to use the rotational angle PM in place of Y-coordinate $Y_g$ of the gravity center position. Also in this case, it is preferable to provide stop region (dead zone) in a manner previously described.

INDUSTRIAL APPLICABILITY

In accordance with the above-described present invention, there are produced a first torque for canceling torque based on load on the base which has been detected by load detecting means comprised of, e.g., plural pressure sensors, a second torque for maintaining the base so that it has a predetermined angle in correspondence with angle about wheel axle of the base which has been detected by angle detecting means comprised of, e.g., gyro sensor and acceleration sensor, and a third torque for performing traveling operation in accordance with position of the load to instruct pair of respective drive motors to perform operations corresponding to the first to third torques to drive a pair of wheels. For this reason, the vehicle body is stable with respect to load weight change, and attitude control and traveling control can be stably and compatibly performed.

Moreover, in the case where position of load on the base is within a predetermined stop region, e.g., the range in a direction perpendicular to the wheel axle is within the range in a direction perpendicular to the wheel axle of ground-contacting region where the pair of wheels are in contact with the load surface, traveling command is not sent. In the case where such position is not within the stop region, traveling command corresponding to that position is sent, thereby making it possible to prevent the vehicle body from advancing/reversing by slight gravity center movement that rider does not intend.

In addition, in the case where position of load on the base is within a predetermined deceleration region, e.g., within the region in the vicinity of the boundary of load detectable range by the load detecting means, traveling command to perform deceleration/stop operation is sent. In the case where such position is not within the deceleration region, traveling command corresponding to that position is sent. Thus, even in the case where gravity center position is greatly shifted, it is possible to stabilize attitude for a second time. As a result, safety is maintained.

The invention claimed is:
1. A coaxial two-wheeled vehicle comprising:
a pair of wheels,
a wheel axle installed or provided between the pair of wheels,
a base supported on the wheel axle so that it can be inclined thereon, a pair of drive motors attached on the base and for driving the pair of respective wheels, load detecting means provided on the base for detecting a position and weight of a load on the base, and angle detecting means provided on the base for detecting an angle of the base about the wheel axle of the base, and a control unit for sending an operation command to the pair of drive motors, wherein the control unit comprises:

a first control mechanism adapted to generate a first torque for canceling torque based on the load, and to generate a second torque for maintaining the base so that it has a predetermined angle in correspondence with the angle about the wheel axle of the base, and a second control mechanism independent of the first control mechanism, which is adapted to generate a third torque for performing a traveling operation in accordance with the position of the load measured by the load detecting means, thus to instruct the pair of respective drive motors to perform operations corresponding to the first to third torques.

2. The coaxial two-wheeled vehicle as set forth in claim 1, wherein the load detecting means comprises plural pressure sensors.

3. The coaxial two-wheeled vehicle as set forth in claim 2, wherein the base is composed of a supporting table and a movable table, and the plural pressure sensors are provided to at least four corners of the supporting table, and the movable table is mounted thereon.

4. The coaxial two-wheeled vehicle as set forth in claim 1, wherein the angle detecting means comprises a gyro sensor and an acceleration sensor.

5. A coaxial two-wheeled vehicle comprising:

a pair of wheels, a wheel axle installed or provided between the pair of wheels, a base supported on the wheel axle so that it can be inclined thereon, a pair of drive motors attached on the base and for driving the pair of respective wheels, load detecting means provided on the base for detecting a position and weight of a load on the base, and angle detecting means provided on the base for detecting an angle of the base about the wheel axle of the base, and a control unit for sending an operation command to the pair of drive motors, wherein the control unit comprises:

a first control mechanism adapted to generate a first torque for canceling torque based on the load, and to generate a second torque for maintaining the base so that it has a predetermined angle in correspondence with the angle about the wheel axle of the base, and a second control mechanism independent of the first control mechanism, which is adapted to generate a third torque for performing a traveling operation in accordance with the position of the load, thus to instruct the pair of respective drive motors to perform operations corresponding to the first to third torques, wherein swivel detecting means for detecting an angle about a vertical axis is provided on the base, and the control unit serves to generate the third torque in accordance with position of the load and angle about the vertical axis.

6. A coaxial two-wheeled vehicle comprising:

a pair of wheels, a wheel axle installed or provided between the pair of wheels, a base supported on the wheel axle so that it can be inclined thereon, a pair of drive motors attached on the base and for driving the pair of respective wheels, load detecting means provided on the base for detecting a position and weight of a load on the base, and angle detecting means provided on the base for detecting an angle of the base about the wheel axle of the base, and a control unit for sending an operation command to the pair of drive motors, wherein the control unit comprises:

a first control mechanism adapted to generate a first torque for canceling torque based on the load, and to generate a second torque for maintaining the base so that it has a predetermined angle in correspondence with the angle about the wheel axle of the base, a second control mechanism independent of the first control mechanism, which is adapted to generate a third torque for performing a traveling operation in accordance with the position of the load, thus to instruct the pair of respective drive motors to perform operations corresponding to the first to third torques, wherein the weight center of the base is located below the wheel axle.

7. A coaxial two-wheeled vehicle comprising:

a pair of wheels, a wheel axle installed or provided between the pair of wheels, a base supported on the wheel axle so that it can be inclined thereon, a pair of drive motors for driving the pair of respective wheels, means for generating a torque to the drive motors for maintaining the base so that it has a predetermined angle in correspondence with the angle about the wheel axle of the base, load detecting means provided on the base for detecting a position and weight of a load on the base in at least a direction perpendicular to the wheel axle, and a control unit for sending an operation command to the pair of drive motors, wherein the control unit is operative so that in the case where the position of the load is within a predetermined stop region having a certain non-zero width in said direction sufficient to comprise a dead band, it does not send a traveling command, while in the case where the position of the load is not within the stop region, it sends a traveling command corresponding to that position to the pair of respective drive motors.

8. The coaxial two-wheeled vehicle as set forth in claim 7, wherein the range in a direction perpendicular to the wheel axle of the stop region is within the range in a direction perpendicular to the wheel axle of a ground-contacting region where the pair of wheels are in contact with the road surface.

9. A coaxial two-wheeled vehicle comprising:

a pair of wheels, a wheel axle installed or provided between the pair of wheels, a base supported on the wheel axle so that it can be inclined thereon, a pair of drive motors for driving the pair of respective wheels, load detecting means provided on the base for detecting a position and weight of a load on the base, and a control unit for sending an operation command to the pair of drive motors, wherein the control unit is operative so that in the case where the position of the load is within a predetermined stop region, it does not send a traveling command, while in the case where the position of the load is not within the stop region, it sends a traveling command corresponding to that position to the pair of respective drive motors, wherein image pick-up means for picking up a forward image, and image processing means for processing the image which has been picked up are further provided on the base, and the control unit sends a traveling command corresponding to processing result of the image processing means to the pair of drive motors.

10. The coaxial two-wheeled vehicle as set forth in claim 9, wherein the image processing means performs processing for detecting position and distance of an obstacle from the image which has been picked up, and the control unit sends a traveling command for avoiding the obstacle to the pair of respective drive motors.

11. The coaxial two-wheeled vehicle as set forth in claim 9, wherein the image processing means performs processing for detecting position and distance of a predetermined object from the image which has been picked up, and the control unit sends a traveling command following the object to the pair of respective drive motors.

12. A coaxial two-wheeled vehicle comprising:
a pair of wheels,
a wheel axle installed or provided between the pair of wheels,
a base supported on the wheel axle so that it can be inclined thereon,
a pair of drive motors for driving the pair of respective wheels,
load detecting means provided on the base for detecting a position and weight of a load on the base, and
a control unit for sending an operation command to the pair of drive motors, wherein the control unit is operative so that in the case where the position of the load is within a predetermined stop region, it does not send a traveling command, while in the case where the position of the load is not within the stop region, it sends a traveling command corresponding to that position to the pair of respective drive motors,
wherein sound collecting means for collecting sound (speech) therearound, and speech (sound) processing means for processing the sound (speech) thus collected are further provided on the base, and the control unit sends a traveling command corresponding to processing result of the speech (sound) processing means to the pair of respective drive motors.

13. The coaxial two-wheeled vehicle as set forth in claim 12, wherein the speech (sound) processing means performs processing for detecting sound source position of the sound (speech) thus collected, and the control unit sends a traveling command for following or avoiding the sound source to the pair of respective drive motors.

14. The coaxial two-wheeled vehicle as set forth in claim 12, wherein the speech (sound) processing means includes memory means in which noise signals corresponding to traveling velocities are recorded in advance to remove frequency component of a noise signal corresponding to a traveling velocity at the time of sound collection from the sound which has been collected thereafter to perform speech (sound) processing.

15. A coaxial two-wheeled vehicle comprising:
a pair of wheels,
a wheel axle installed or provided between the pair of wheels,
a base supported on the wheel axle so that it can be inclined thereon,
a pair of drive motors attached on the base and for driving the pair of respective wheels,
means for generating a torque to the drive motors for maintaining the base so that it has a predetermined angle in correspondence with the angle about the wheel axle of the base,
load detecting means for detecting a position and weight of a load on the base provided on the base in at least a direction perpendicular to the wheel axle,
a control unit for sending an operation command to the pair of drive motors, wherein the control unit is operative so that in the case where the position of the load is within a predetermined deceleration region having a certain non-zero width in said direction sufficient to comprise a dead band, it sends a traveling command for performing a deceleration/stop operation to the pair of respective drive motors, while in the case where the position of the load is not within the deceleration region, it sends a traveling command corresponding to that position to the pair of respective drive motors.

16. The coaxial two-wheeled vehicle as set forth in claim 15, wherein the deceleration region is a region in the vicinity of the boundary of a load detectable range by the load detecting means.

17. The coaxial two-wheeled vehicle as set forth in claim 1, further comprising an adder that adds the first and second torques, thus to instruct the pair of respective drive motors to perform operations corresponding to the first to third torques.

18. The coaxial two-wheeled vehicle as set forth in claim 7, wherein angle detecting means for detecting angle about the wheel axle of the base is further provided on the base, and the control unit is composed of a first control mechanism adapted to generate a first torque for canceling torque based on the load, and to generate a second torque for maintaining the base so that it has a predetermined angle in correspondence with the angle about the wheel axle of the base, and a second control mechanism independent of the first control mechanism, which is adapted to generate a third torque for performing a traveling operation in accordance with the position of the load, thus to instruct the pair of respective drive motors to perform operations corresponding to the first to third torques.

19. The coaxial two-wheeled vehicle as set forth in claim 18, wherein the load detecting means comprises plural pressure sensors.

20. The coaxial two-wheeled vehicle as set forth in claim 19, wherein the base is composed of a supporting table, and a movable table, and the plural pressure sensors are provided at four corners of at least the supporting table, and the movable table is mounted thereon.

21. The coaxial two-wheeled vehicle as set forth in claim 18, wherein the angle detecting means comprises a gyro sensor and an acceleration sensor.

* * * * *